US00RE49273E

(19) United States
(12) Reissued Patent
Yamaguchi et al.

(10) Patent Number: US RE49,273 E
(45) Date of Reissued Patent: Nov. 1, 2022

(54) SWITCH AND MEMORY DEVICE

(71) Applicant: KIOXIA CORPORATION, Minato-ku (JP)

(72) Inventors: Takashi Yamaguchi, Yokohama (JP); Norikazu Yoshida, Kawasaki (JP); Mitsuru Anazawa, Sagamihara (JP)

(73) Assignee: KIOXIA CORPORATION, Minato-ku (JP)

(21) Appl. No.: 17/012,714

(22) Filed: Sep. 4, 2020

Related U.S. Patent Documents

Reissue of:
(64) Patent No.: 10,445,018
Issued: Oct. 15, 2019
Appl. No.: 15/450,407
Filed: Mar. 6, 2017

U.S. Applications:
(63) Continuation of application No. 15/450,407, filed on Mar. 6, 2017, now Pat. No. 10,445,018.

(60) Provisional application No. 62/385,402, filed on Sep. 9, 2016.

(51) Int. Cl.
*G06F 13/42* (2006.01)
*G06F 3/06* (2006.01)
*G06F 13/40* (2006.01)

(52) U.S. Cl.
CPC ..... *G06F 3/0659* (2013.01); *G06F 3/061* (2013.01); *G06F 3/0688* (2013.01); *G06F 13/4022* (2013.01); *G06F 13/4282* (2013.01); *G06F 2213/0026* (2013.01)

(58) Field of Classification Search
CPC ..... G06F 13/4054; G06F 13/4022; G06F 3/0665; G06F 9/30145; G06F 13/28; G06F 13/4068; G06F 3/0659; G06F 13/4059; G06F 3/0679; G06F 3/0689; G06F 3/061; G06F 3/0688; G06F 3/0613; G06F 3/0608
USPC ..... 710/3, 308, 5; 711/154, 165, 103, 105; 709/213; 714/6.11
See application file for complete search history.

(56) References Cited

U.S. PATENT DOCUMENTS 8,578,084 B2 11/2013 Borchers et al.
8,612,678 B2 * 12/2013 Coatney ..... G06F 3/0605 711/114
8,966,164 B1 * 2/2015 Asnaashari ..... G06F 12/0246 711/103
9,229,854 B1 * 1/2016 Kuzmin ..... G06F 11/1072
9,336,173 B1 * 5/2016 Sodke ..... G06F 3/0665
9,384,093 B1 * 7/2016 Aiello ..... G06F 3/0688
9,563,367 B2 * 2/2017 Chu ..... G06F 3/0679
9,921,757 B1 * 3/2018 Rowett ..... G06F 3/0611
(Continued)

*Primary Examiner* — Christopher E. Lee
(74) *Attorney, Agent, or Firm* — Oblon, McClelland, Maier & Neustadt, L.L.P.

(57) ABSTRACT

A switch according to an embodiment includes a first PCIe interface that can be connected to a host on the basis of a PCIe standard. In addition, the switch includes a plurality of second PCIe interfaces that can be connected to a plurality of storage devices, respectively, on the basis of the PCIe standard. The switch further includes a control unit that distributes an access request which is comply with an NVMe standard and is transmitted from the host to any one of the plurality of second PCIe interfaces. The distribution includes a process of constructing an NVMe command of the access request and a process of constructing a data transmission descriptor list of the access request.

74 Claims, 22 Drawing Sheets

(56) References Cited

U.S. PATENT DOCUMENTS 9,984,021 B1* 5/2018 BeSerra ..... G06F 13/4054
9,996,484 B1* 6/2018 Davis ..... G06F 13/105
2005/0005063 A1 1/2005 Liu et al.
2011/0296117 A1* 12/2011 Fukuda ..... G06F 12/1483 711/154
2013/0024595 A1* 1/2013 Subramaniyan ..... G06F 13/28 710/308
2013/0198311 A1* 8/2013 Tamir ..... G06F 15/167 709/212
2013/0232279 A1* 9/2013 Adar ..... G06F 9/30145 710/3
2014/0006742 A1* 1/2014 Tokumitsu ..... G06F 3/0689 711/165
2014/0195634 A1* 7/2014 Kishore ..... H04L 67/1097 709/213
2014/0281040 A1* 9/2014 Liu ..... G06F 13/16 710/3
2014/0281147 A1* 9/2014 Yoshimura ..... G06F 12/0246 711/103
2014/0317339 A1 10/2014 Hsu
2014/0337540 A1* 11/2014 Johnson ..... G06F 13/14 710/5
2014/0351484 A1* 11/2014 Freking ..... G06F 13/4022 710/314
2015/0026509 A1* 1/2015 Zhang ..... G06F 13/4059 714/6.11
2015/0067291 A1* 3/2015 Miyamoto ..... G06F 3/0688 711/167
2015/0095554 A1* 4/2015 Asnaashari ..... G06F 12/0246 711/103
2015/0134857 A1* 5/2015 Hahn ..... G06F 3/061 710/5
2015/0177994 A1* 6/2015 Vucinic ..... G06F 3/0613 711/103
2015/0253999 A1* 9/2015 Nemazie ..... G06F 3/0608 711/103
2015/0324118 A1* 11/2015 McCambridge ..... G06F 3/0613 710/5
2016/0098227 A1* 4/2016 Bandic ..... G06F 3/061 711/103
2016/0124876 A1* 5/2016 Vucinic ..... G06F 13/28 710/308
2016/0147442 A1* 5/2016 Baderdinni ..... G06F 3/061 711/105
2016/0283305 A1* 9/2016 Kugata ..... G06F 13/4022
2016/0292111 A1* 10/2016 Doo ..... G06F 13/3625
2016/0306580 A1* 10/2016 Pinto ..... G06F 13/4068
2016/0342545 A1* 11/2016 Arai ..... G06F 12/0868
2017/0022494 A1* 1/2017 Hill ..... G12N 15/1055
2017/0075827 A1* 3/2017 Ward ..... G06F 13/1668
2017/0192718 A1* 7/2017 Tsujimoto ..... G06F 3/0659
2017/0212858 A1* 7/2017 Chu ..... G06F 12/0246
2017/0255583 A1* 9/2017 Shih ..... G06F 13/4022
2017/0262380 A1* 9/2017 Yoshida ..... G06F 12/1009
2018/0018090 A1* 1/2018 Lu ..... G06F 3/0659
2018/0067890 A1* 3/2018 Espeseth ..... G06F 13/4282
2018/0101450 A1* 4/2018 Park ..... G06F 11/1469
2018/0314654 A1* 11/2018 Long ..... G06F 13/4265
2019/0108158 A1* 4/2019 Kachare ..... G06F 13/1668

* cited by examiner

SWITCH AND MEMORY DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is based upon and claims the benefit of priority from U.S. Provisional Application No. 62/385,402, filed on Sep. 9, 2016; the entire contents of which are incorporated herein by reference.

FIELD

Embodiments described herein relate generally to a switch and a memory device.

BACKGROUND

There is a host adapter standard for a storage device according to the related art, such as a SATA storage device or a SAS storage device, on the assumption that the storage device has multiple ports. Therefore, a plurality of storage devices can be combined through one RAID controller to construct a storage array. It is preferable that a plurality of storage devices comply with (based on) a Peripheral Component Interconnect express (PCIe) standard be combined to form a storage array.

DETAILED DESCRIPTION

Figure 1:
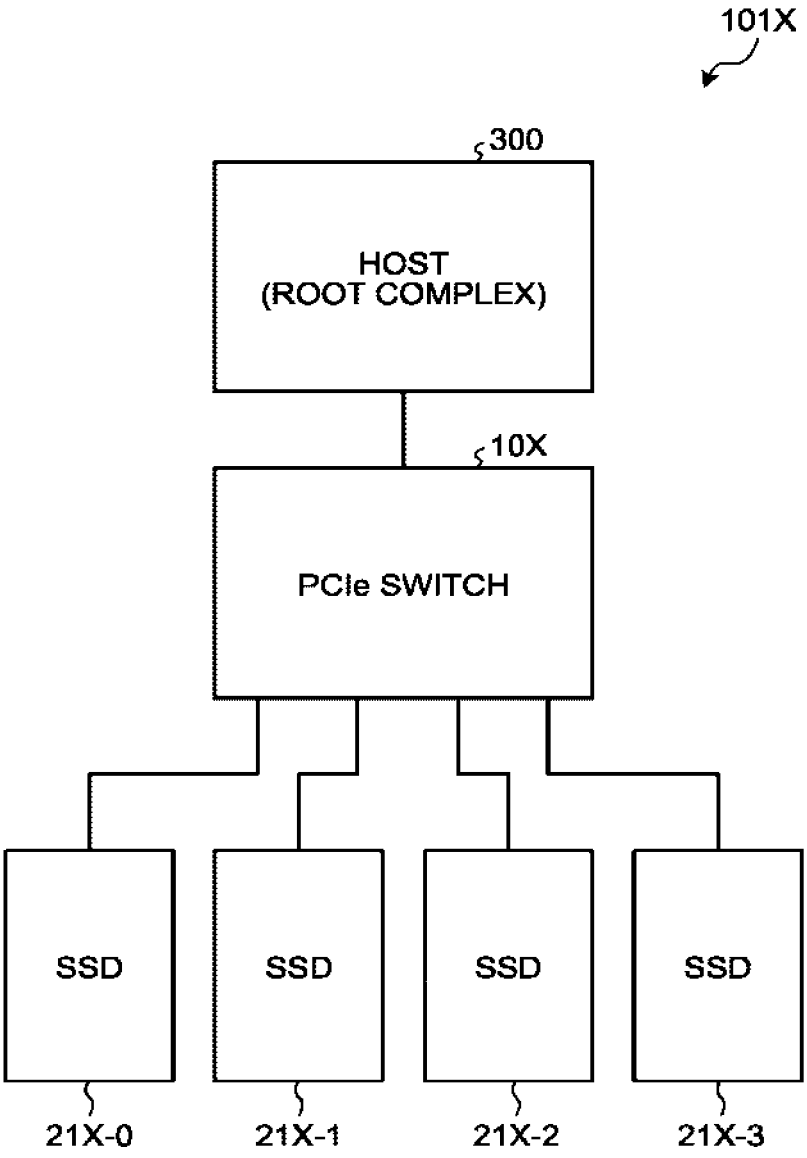
FIG. 1 is a diagram illustrating an example of the structure of a storage system according to a first embodiment.

According to one embodiment, a switch is provided. The switch includes a first PCIe interface that can be connected to a host on the basis of a PCIe standard. In addition, the switch includes a plurality of second PCIe interfaces that can be connected to a plurality of storage devices, respectively, on the basis of the PCIe standard. The switch further includes a control unit that distributes an access request which is comply with an NVMe standard and is transmitted from the host to any one of the plurality of second PCIe interfaces. The distribution includes a process of reconstructing an NVMe command of the access request and a process of reconstructing a data transmission descriptor list of the access request.

Hereinafter, switches and memory devices according to embodiments will be described in detail with reference to the accompanying drawings. The invention is not limited by the embodiments.

First Embodiment

In general, SATA or SAS is used as an interface of a storage device (for example, a solid state drive (SSD)). However, in the interface standards, a bottleneck occurs in the bandwidth of the interface and it is difficult to associate the improvement of the read/write performance of a storage device with an increase in the transmission speed of data between the storage device and a host. For this reason, as the interface standard of the storage device, the following standards have come into widespread use: a PCI express (PCIe) standard having characteristics, such as a wide band, low latency, and high extendibility; and a Non-Volatile Memory express (NVMe) standard in which a non-volatile memory (storage memory) is treated on an interface based on the PCIe standard.

For example, a storage device for a server requires high capacity. In this case, since one storage device has a limited capacity, for example, a topology is used in which a plurality of storage devices are connected to a host (server) through a switch comply with the PCIe standard or the NVMe standard. However, this switch does not make the host recognize a plurality of storage devices as one high-capacity storage device, unlike a RAID controller. Therefore, the host needs to individually manage a plurality of storage devices. As a result, a burden on the host increases.

In a storage device (hereinafter, referred to as a PCIe/NVMe device) comply with the PCIe standard or the NVMe standard, a single root I/O virtualization (SRIOV) standard is used. SRIOV is a technique that creates a plurality of new devices based on, for example, one PCIe/NVMe device (one physical resource) and allocates a plurality of virtual machines to the new devices. SRIOV has the advantage that, since one physical resource can be shared by a plurality of machines, it is possible to add a new device, without increasing costs.

This embodiment provides a switch module that simulates a PCIe/NVMe endpoint, considering the above-mentioned problems. The switch module is connected between the host and a plurality of PCIe/NVMe devices and functions as one storage device (endpoint) for the host. That is, the switch module can make the host recognize a plurality of PCIe/NVMe devices as one high-capacity storage device. In this embodiment, it is possible to achieve one high-capacity storage device, without increasing a burden on the host. Therefore, this embodiment is effective in a storage system such as a server. Hereinafter, the switch module is referred to as a PCIe switch (EP-like switch module).

(Storage System)

FIG. 1 is a diagram illustrating an example of the structure of a storage system according to the first embodiment. A storage system 101X includes, for example, a host 300 that functions as a server, SSDs 21X-0 to 21X-3 that function as PCIe/NVMe devices, and a PCIe switch (PCIe SW) 10X. The PCIe switch 10X is connected between the host 300 and a plurality of PCIe/NVMe devices. The PCIe switch 10X includes a PCIe interface that can be connected to an external device, such as the host 300, and PCIe interfaces that can be connected to the plurality of PCIe/NVMe devices. The PCIe switch 10X is applied to a storage array which is a combination of a plurality of storage devices.

The PCIe switch 10X is connected as an endpoint to the host 300, instead of a switch upstream port (USP). In addition, the PCIe switch 10X includes a switch downstream port (DSP). The switch downstream port is connected to the endpoint side. The switch downstream port is connected to the PCIe/NVMe device through a PCIe bus.

The PCIe switch 10X further includes a routing logic (a routing logic 14 which will be described below). The routing logic 14 which is a logic circuit relays data between a root port of the host 300 and the DSP connected to the PCIe/NVMe device.

The PCIe switch 10X according to this embodiment simulates a PCIe endpoint. In other words, in the storage system 101X, the host 300 recognizes the PCIe switch 10X as a PCIe endpoint. The PCIe endpoint includes a basic NVMe register set (NVMe registers 54 which will be described below) and relays a request from the host 300 to the PCIe/NVMe device. For this operation, the PCIe switch 10X distributes access from the host 300 to a plurality of PCIe/NVMe devices (drives) connected to the downstream port.

The PCIe/NVMe devices are, for example, SSDs 21X-0 to 21X-3. The host 300 has a root complex function. The host 300 may include a plurality of PCIe/NVMe ports. In addition, the host 300 may be connected to, for example, a CPU or a memory.

The PCIe/NVMe device may be a device that can store data in a non-volatile manner. In this embodiment, a plurality of PCIe/NVMe devices are four SSDs 21X-0 to 21X-3. However, two, three, or five or more PCIe/NVMe devices may be provided.

The PCIe switch 10X acts as one storage device (endpoint) with respect to the host 300. That is, the PCIe switch 10X makes the host 300 recognize a plurality of SSDs 21X-0 to 21X-3 as one high-capacity storage device.

In the storage system 101X according to this embodiment, the host 300 is connected to the plurality of SSDs 21X-0 to 21X-3 through the PCIe switch (switch module) 10X that acts as one endpoint with respect to the host 300 which is a host device. Therefore, it is possible to easily provide a storage array obtained by combining the plurality of SSDs 21X-0 to 21X-3 which are the existing SSD drives.

The PCIe switch 10X according to this embodiment does not function as a PCIe switch defined by the standard and acts as one SSD device. A switching unit (routing logic 14) of the PCIe switch 10X manages the routing of transactions and performs, for example, a process (reconstruction process) of translating commands to be transmitted to the SSDs 21X-0 to 21X-3 connected to an internal bus, a process of translating a data transmission descriptor list (PRP list), and a synchronization process when transmission is completed (when a process is completed).

Figure 2:
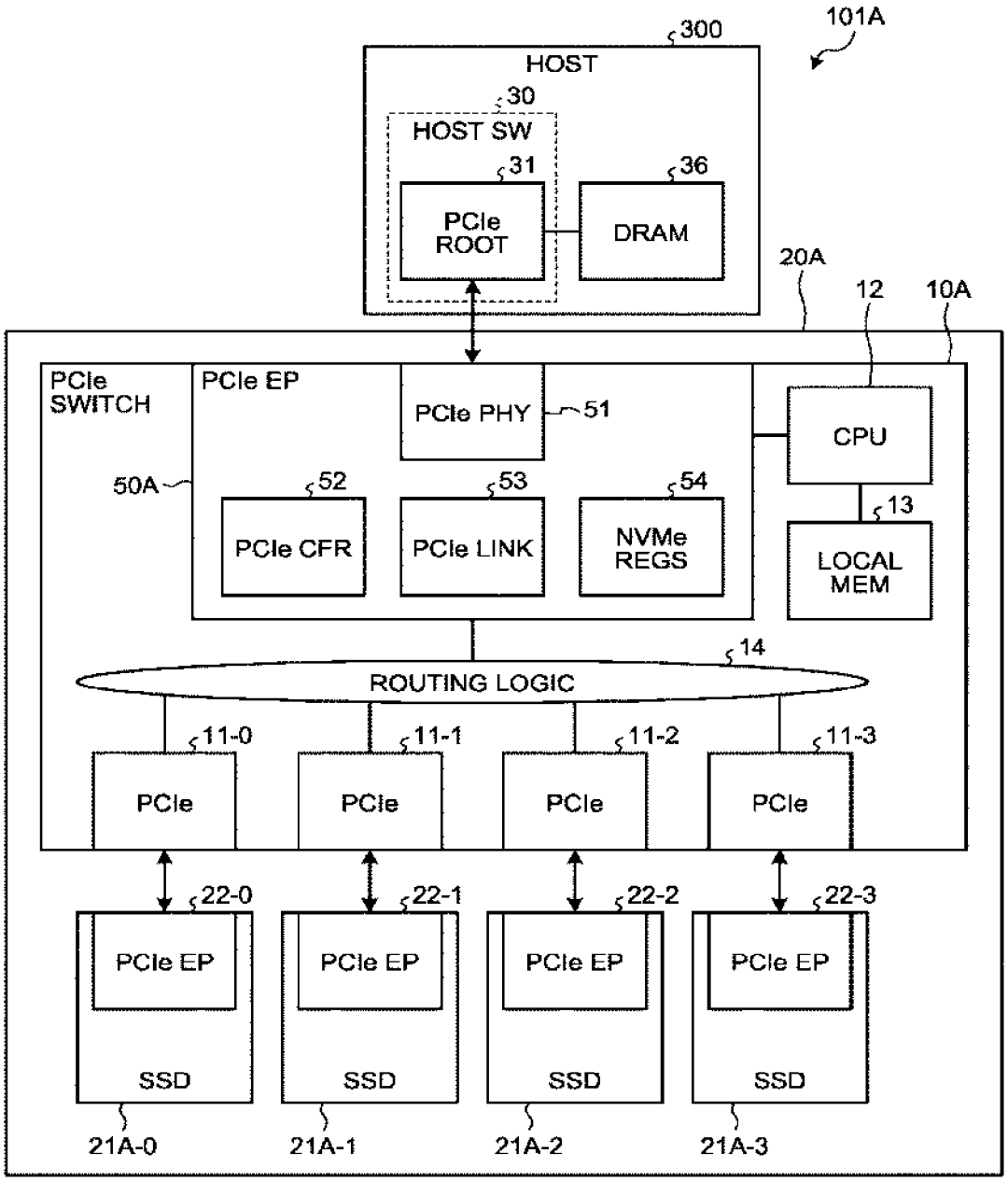
FIG. 2 is a diagram illustrating an example of the structure of a PCIe switch according to the first embodiment.

FIG. 2 is a diagram illustrating an example of the structure of the PCIe switch according to the first embodiment. FIG. 2 illustrates the structure of a storage system 101A which is an example of the storage system 101X. In addition, FIG. 2 illustrates the structure of a PCIe switch 10A which is an example of the PCIe switch 10X. SSDs 21A-0 to 21A-3 are an example of the SSDs 21X-0 to 21X-3, respectively.

An SSD system (memory device) 20A connected to the host 300 includes the PCIe switch 10A and the SSDs 21A-0 to 21A-3. The PCIe switch 10A is connected to the SSDs 21A-0 to 21A-3.

The host 300 includes host software (SW) 30 and a dynamic random access memory (DRAM) 36 which is a host memory (Mem) provided on the host device side. The host SW 30 has the function of a PCIe root 31 (root complex). The PCIe root 31 is connected to the DRAM 36.

The PCIe root 31 transmits and receives data to and from a PCIe physical layer (PHY) 51 of the PCIe switch 10A. The PCIe root 31 generates, for example, a data read command, a data write command, and a data erase commands for the PCIe switch 10A. The DRAM 36 stores, for example, information which is used by the PCIe root 31 or information which is generated by the PCIe root 31. Specifically, the DRAM 36 stores, for example, a submission queue (SQ) entry, a completion queue (CQ) entry, a physical region pointer (PRP), and data.

In the SQ entry, an NVMe command which is transmitted from the host 300 to the PCIe switch 10A is stored in a queue (circular buffer). The NVMe command stored in the SQ entry is written by the host 300 and is read by the PCIe switch 10A.

In the CQ entry, information which is transmitted from the PCIe switch 10A to the host 300 is stored in a queue (circular buffer). The information stored in the CQ entry indicates the completion of the execution of the command received from the host 300. The information stored in the CQ entry is written by the PCIe switch 10A and is read by the host 300.

The PRP is a pointer which designates a position (physical memory) used for data transmission and is designated by the host 300.

The PCIe switch 10A includes a PCIe endpoint (EP) 50A which is recognized as a PCIe endpoint by the host 300, a CPU 12, and a local memory 13. The PCIe EP 50A performs a process corresponding to instruction information from the host 300 or the CPU 12. The PCIe EP 50A includes the PCIe PHY (first port) 51 which is based on the PCIe/NVMe standard and can be connected to the host 300, a PCIe CFR 52, a PCIe link 53, and NVMe registers (Regs) 54.

The PCIe switch 10A includes the routing logic 14 and a plurality of PCIes (second ports) 11-0, 11-1, 11-2, and 11-3 which are based on the PCIe/NVMe standard and can be connected to the plurality of SSDs 21A-0 to 21A-3, respectively.

The PCIe switch 10A is formed by, for example, one chip. The PCIe switch 10A may be formed by hardware or a combination of hardware and software. For example, the PCIe EP 50A or the routing logic 14 is formed by hardware.

The CPU 12 is connected to the PCIe EP 50A and the local memory 13. The PCIe EP 50A is connected to the routing logic 14. The routing logic 14 is connected to the PCIes 11-0, 11-1, 11-2, and 11-3. The CPU 12 controls the PCIe EP 50A and the routing logic 14, using data stored in the local memory 13 or software (program) stored in a certain memory. The CPU 12 transmits instruction information to the PCIe EP 50A and the routing logic 14, on the basis of commands transmitted from the host 300.

The SSDs 21A-0 to 21A-3 include PCIe endpoints (EPs) 22-0 to 22-3, respectively. The PCIe EP 22-0 of the SSD 21A-0 is connected to the PCIe 11-0 of the PCIe switch 10A through the bus. The PCIe EP 22-1 of the SSD 21A-1 is connected to the PCIe 11-1 of the PCIe switch 10A through the bus. The PCIe EP 22-2 of the SSD 21A-2 is connected to the PCIe 11-2 of the PCIe switch 10A through the bus.

The PCIe EP 22-3 of the SSD 21A-3 is connected to the PCIe 11-3 of the PCIe switch 10A through the bus.

The PCIe PHY 51 is a physical layer defined by the PCIe standard. The PCIe PHY 51 is an analog IF (PCIe interface) which is connected to the PCIe root 31 of the host 300 and transmits and receives data to and from the host 300.

The PCIe CFR 52 is a configuration register defined by the PCIe standard. The PCIe CFR 52 includes a base address register (BAR). The BAR is used when the PCIe link 53 uses, for example, the NVMe registers 54.

The PCIe link 53 is a bus controller that controls a bus defined by the PCIe standard and has the function of a PCIe agent. The PCIe link 53 controls a physical layer, a data link layer, and a transaction layer. The PCIe link 53 maps a virtual memory to physical memories of the SSDs 21A-0 to 21A-3 and reads and writes data.

The NVMe registers 54 are controller registers defined by the PCIe standard. The NVMe registers 54 are a basic register set for operating as a storage device. The NVMe registers 54 store, for example, a doorbell which is updated by the host 300.

The local memory 13 is a volatile memory, such as a dynamic random access memory (DRAM) or a static random access memory (SRAM). The local memory 13 may be a non-volatile memory, such as a magnetic random access memory (MRAM) or a resistance change random access memory (ReRAM). The local memory 13 is used, for example, when the CPU 12 performs various processes. The local memory 13 stores, for example, an SQ entry which is reconstructed for EPs (SSDs 21A-0 to 21A-3) and a PRP list which is reconstructed for the EPs. In the local memory 13, for an SQ entry, a CQ entry, and a PRP, independent regions are ensured for each of the PCIe ports (PCIes 11-0 to 11-3).

The routing logic 14 performs a process corresponding to instruction information from the CPU 12. The routing logic 14 manages the routing of transactions. Here, the transaction is the unit of processing in the plurality of SSDs 21A-0 to 21A-3. The term "routing" means a structure in which the process of one of the plurality of SSDs 21A-0 to 21A-3 can be performed by another SSD. The routing logic 14 distributes data transmitted from the host 300 to any one of the SSDs 21A-0 to 21A-3 (PCIe11-0, 11-1, 11-2, 11-3). The routing logic 14 performs a data transmission descriptor (PRP) translation process. In addition, the routing logic 14 has a routing function of integrating (synchronizing) transmission completion notification processes (process completion notification processes) or interrupt processes from the SSDs 21A-0 to 21A-3 to the host 300, in response to an instruction from the CPU 12. In other words, the CPU 12 controls the transmission completion notification processes or the interrupt processes from the SSDs 21A-0 to 21A-3 to the host 300.

The CPU 12 may perform the process of the routing logic 14 or the routing logic 14 may perform the process of the CPU 12.

The PCIes 11-0 to 11-3 are switch downstream ports and transmit and receive data to and from the PCIe EP 22-0 of the SSD 21A-0 through the PCIe bus.

As such, in the storage system 101A, the host 300 is connected to the SSDs 21A-0 to 21A-3 through the PCIe switch 10A which is regarded as one endpoint by the host 300. The PCIe switch 10A includes the NVMe registers 54 for operating as a storage device and relays access to the SSDs 21A-0 to 21A-3. In addition, the PCIe switch 10A divides or translates commands to be transmitted to each of the SSDs 21A-0 to 21A-3, if necessary, and synchronizes the completion processes of the SSDs 21A-0 to 21A-3 which are operated in parallel and out of order. Therefore, the PCIe switch 10A appropriately notifies the host 300 that the process of one device has been completed.

For example, the PCIe switch 10A determines which of the SSDs 21A-0 to 21A-3 performs a process corresponding to a command according to each address. For example, the PCIe switch 10A makes the SSD 21A-0 perform a process in response to a command in which a first address range is designated and makes the SSD 21A-1 perform a process in response to a command in which a second address range is designated. In addition, for example, the PCIe switch 10A makes the SSD 21A-2 perform a process in response to a command in which a third address range is designated and makes the SSD 21A-3 perform a process in response to a command in which a fourth address range is designated.

In the storage system 101A, the PCIe switch 10A is a master and controls the SSDs 21A-0 to 21A-3 connected to each EP in parallel. In this case, the PCIe switch 10A performs striping for logical block addressing (LBA) and distributes the command to the drives. Therefore, it is possible to improve the performance, using the same effect as that of RAID0.

Figure 3:
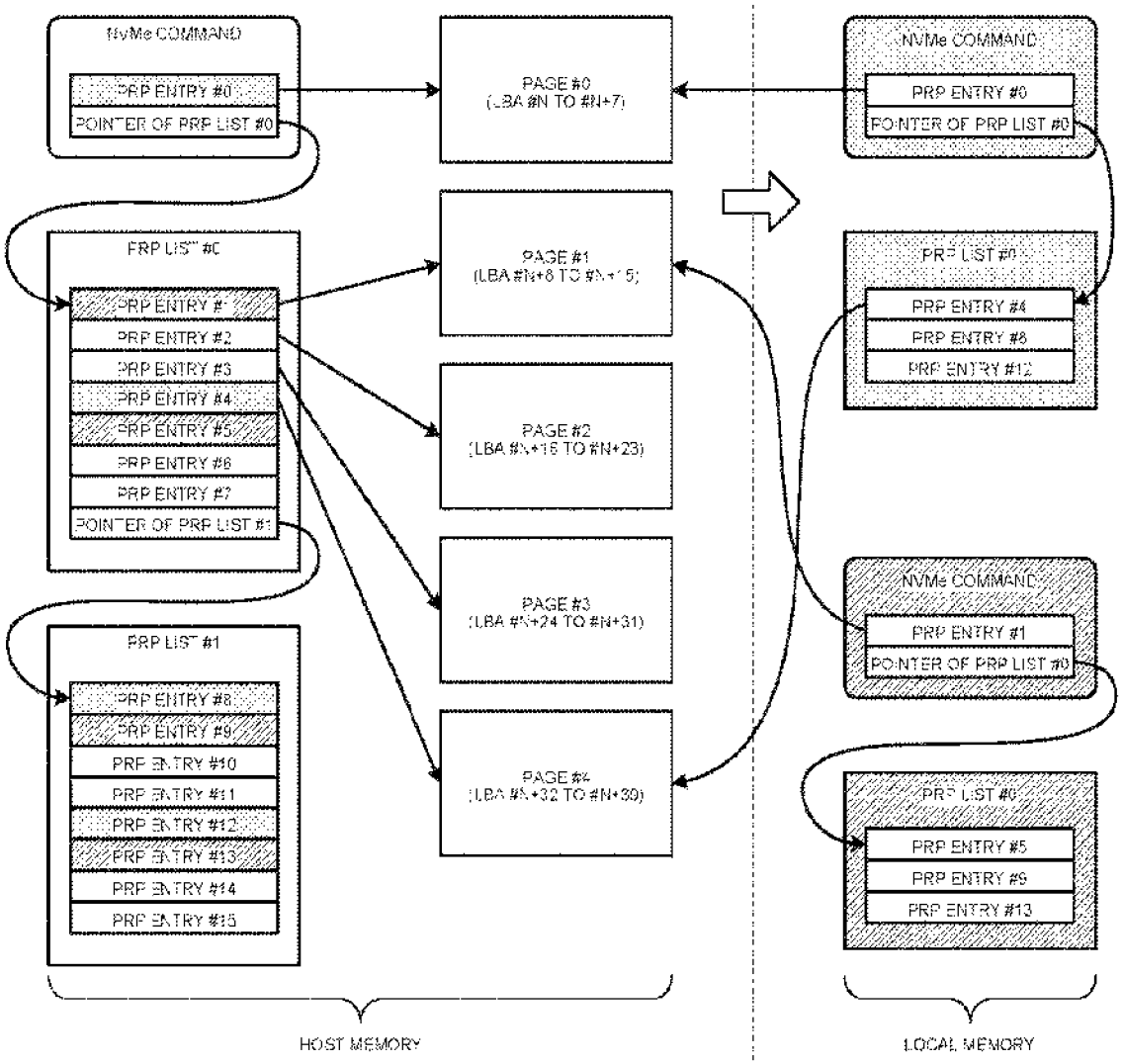
FIG. 3 is a diagram illustrating an example of the reconstruction of a command and a PRP list.

Next, an example of the reconstruction of a command will be described. FIG. 3 is a diagram illustrating an example of the reconstruction of a command and a PRP list. When a command is transmitted from the host 300, the PCIe switch 10A reconstructs the NVMe command and the PRP list, which is a list of PRPs, as a command construction process.

The PCIe switch 10A generates an SQ entry for each of the SSDs 21A-0 to 21A-3 as the command construction process. In other words, when performing the command reconstruction process, the PCIe switch 10A distributes the reconstructed NVMe command to the SQ entries generated for each EP (SSDs 21A-0 to 21A-3).

As such, the PCIe switch 10A generates the SQ entry for each EP, using the reconstructed NVMe command. Therefore, the SQ entry (NVMe command) for the PCIe switch 10A generated by the host 300 is reconstructed as an SQ entry (NVMe command) for each EP in the PCIe switch 10A. Next, an example of a process for reconstructing a command and a PRP list will be described.

The command based on the NVMe standard which is generated by the host 300 includes an NVMe command and a PRP list. The NVMe command and the PRP list each include one or a plurality of PRP entries and a pointer of the next PRP list.

FIG. 3 illustrates a case in which the host 300 generates an NVMe command and PRP lists #0 and #1. Here, the NVMe command includes a PRP entry #0 and a pointer of the PRP list #0. The pointer of the PRP list #0 indicates the PRP list #0.

The PRP list #0 includes PRP entries #1 to #7 and a pointer of a PRP list #1. The pointer of the PRP list #1 indicates the PRP list #1. The PRP list #1 includes PRP entries #8 to #15.

Commands are stored in the PRP entries #0 to #15. For example, a command corresponding to a page #0 (LBAs #N to #N+7) (N is a natural number) is stored in the PRP entry #0.

Similarly, a command corresponding to a page #1 (LBAs #N+8 to #N+15) is stored in the PRP entry #1 and a command corresponding to a page #2 (LBAs #N+16 to #N+23) is stored in the PRP entry #2. In addition, a command corresponding to a page #3 (LBAs #N+24 to #N+31) is stored in the PRP entry #3 and a command corresponding to a page #4 (LBAs #N+32 to #N+39) is stored in the PRP entry #4.

When the command is a write command, data to be written to the SSDs 21A-0 to 21A-3 is stored in pages. When the command is a read command, data read from the SSDs 21A-0 to 21A-3 is stored in pages.

For the command, the CPU 12 of the PCIe switch 10A performs a process of reconstructing an NVMe command and a PRP list. The PCIe switch 10A generates an NVMe command and a PRP list for each of the SSDs 21A-0 to 21A-3 as the process of reconstructing an NVMe command and a PRP list.

For example, the CPU 12 uses a PRP entry having an entry number of "a multiple of 4" as a command for the SSD 21A-0 and uses a PRP entry having an entry number of "a multiple of 4+1" as a command for the SSD 21A-1. For example, the CPU 12 uses a PRP entry having an entry number of "a multiple of 4+2" as a command for the SSD 21A-2 and uses a PRP entry having an entry number of "a multiple of 4+3" as a command for the SSD 21A-3.

FIG. 3 illustrates a case in which the CPU 12 generates an NVMe command for the SSD 21A-0 and an NVMe command for the SSD 21A-1. The NVMe command for the SSD 21A-0 includes a PRP entry #0 and a pointer of a PRP list #0. In addition, the PRP list #0 includes PRP entries #4, #8, and #12.

The NVMe command for the SSD 21A-1 includes a PRP entry #1 and a pointer of a PRP list #0. The PRP list #0 includes PRP entries #5, #9, and #13. As such, the command and the PRP from the host 300 are reconstructed as a command and a PRP list for each SSD.

Next, the operation procedure of the storage system 101A including the PCIe switch 10A will be described. FIGS. 4A to 4E are diagrams illustrating the operation procedure of the storage system according to the first embodiment.

The PCIe switch 10A has a doorbell stored in, for example, the NVMe registers 54. Information indicating that the host 300 has updated a command is stored in the doorbell. In the NVMe standard, the command generated by the host 300 is stored in, for example, the DRAM 36 of the host 300.

(FIG. 4A)

When viewed from the host 300, only one PCIe switch 10A is connected as an SSD to the host 300. The host 300 generates, for example, a read command and a write command designating an address (PRP) for the PCIe switch 10A and stores the commands. In other words, the PCIe root 31 of the host 300 prepares a command and a PRP and stores the command and the PRP in the DRAM 36 which is a host memory. Then, the host 300 updates the doorbell in the NVMe registers 54. Then, the CPU 12 of the PCIe switch 10A fetches the SQ entry and the PRP in the DRAM 36 (ST1 to ST3).

When the fetched command is recognized as a command that will be distributed to each EP (SSDs 21A-0 to 21A-3) and will be executed, the CPU 12 reconstructs an SQ entry and a PRP list for each endpoint (EP) (ST4). The reconstructed SQ entry and PRP are stored in the local memory 13.

Then, the CPU 12 updates the doorbell of each EP (ST5 and ST6). The doorbell is stored in the NVMe registers in the SSDs 21A-0 to 21A-3. For example, in the case of the command to be transmitted to the SSD 21A-0, the CPU 12 updates the doorbell of the SSD 21A-0.

When drives, such as the SSDs 21A-0 to 21A-3, support a controller memory buffer, the reconstruction destination of the PRP list is not the local memory 13 of the PCIe switch 10A and the PRP list may be directly developed in a memory of the drive. In this case, since the drive does not need to issue a read request to the bus, transmission efficiency is improved. In this embodiment, a case in which the PRP list is reconstructed in the local memory 13 of the PCIe switch 10A will be described.

Figure 4A:
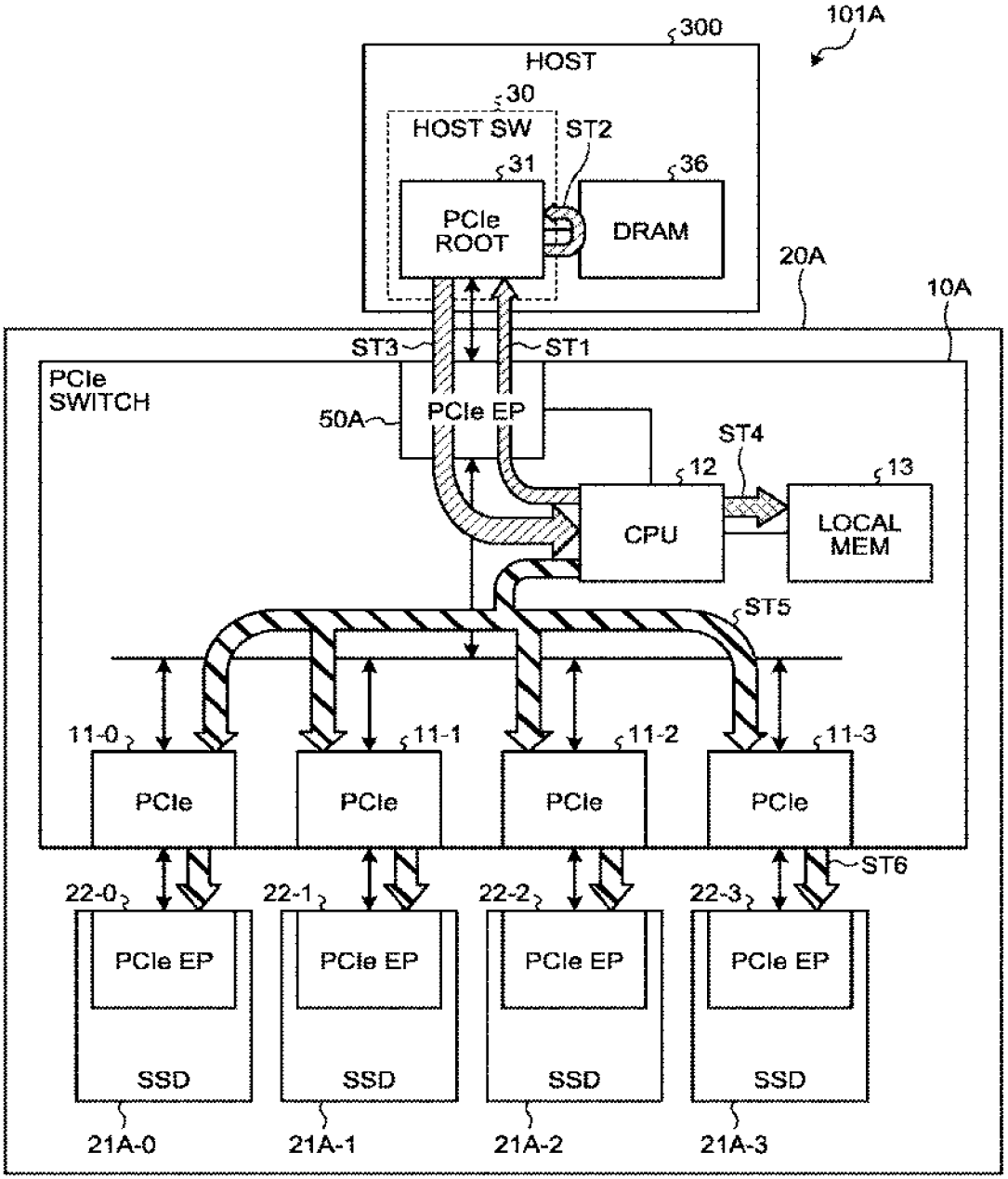
FIGS. 4A to 4E are diagrams illustrating the operation procedure of the storage system according to the first embodiment.
Figure 4B:
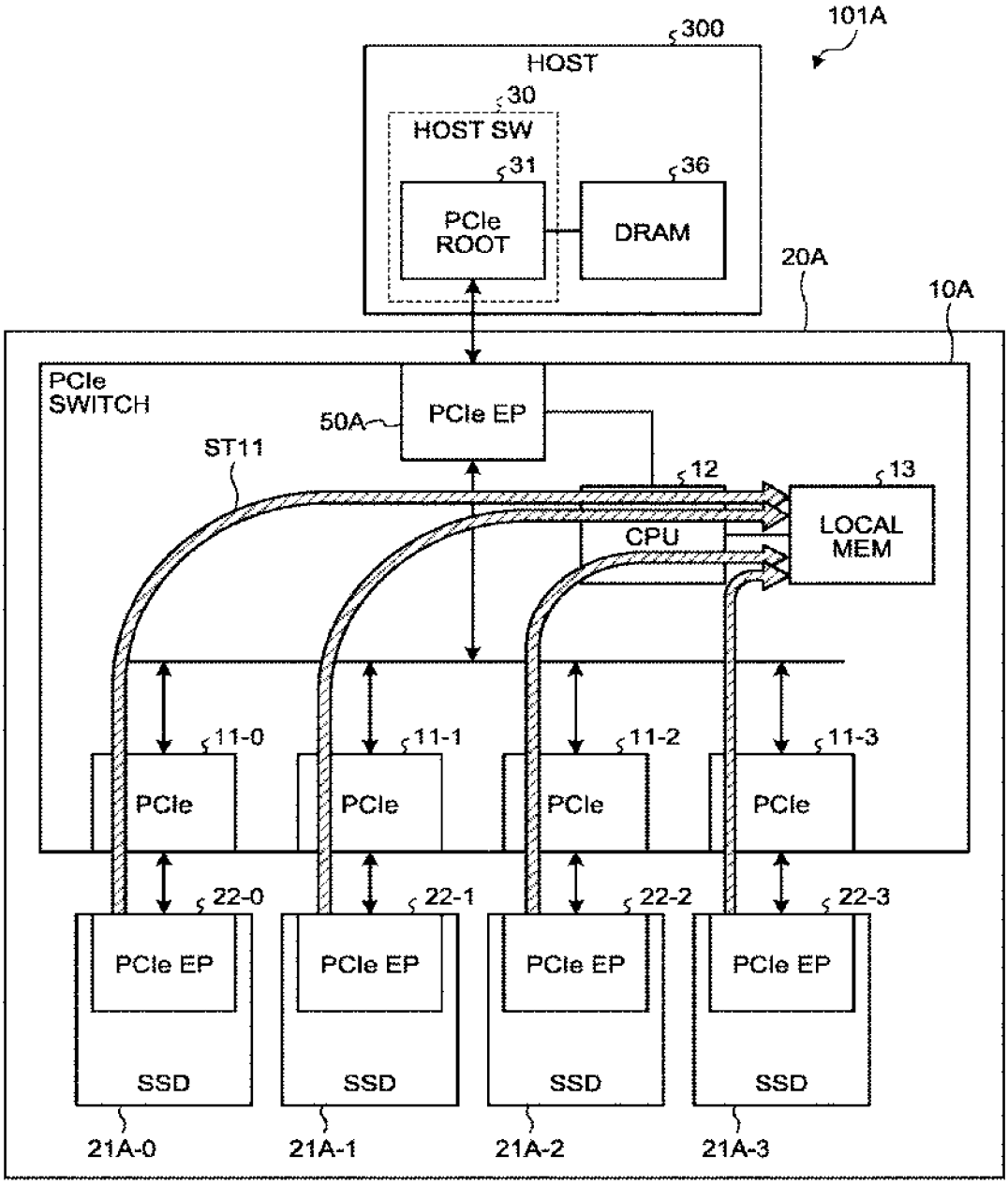
Figure 4C:
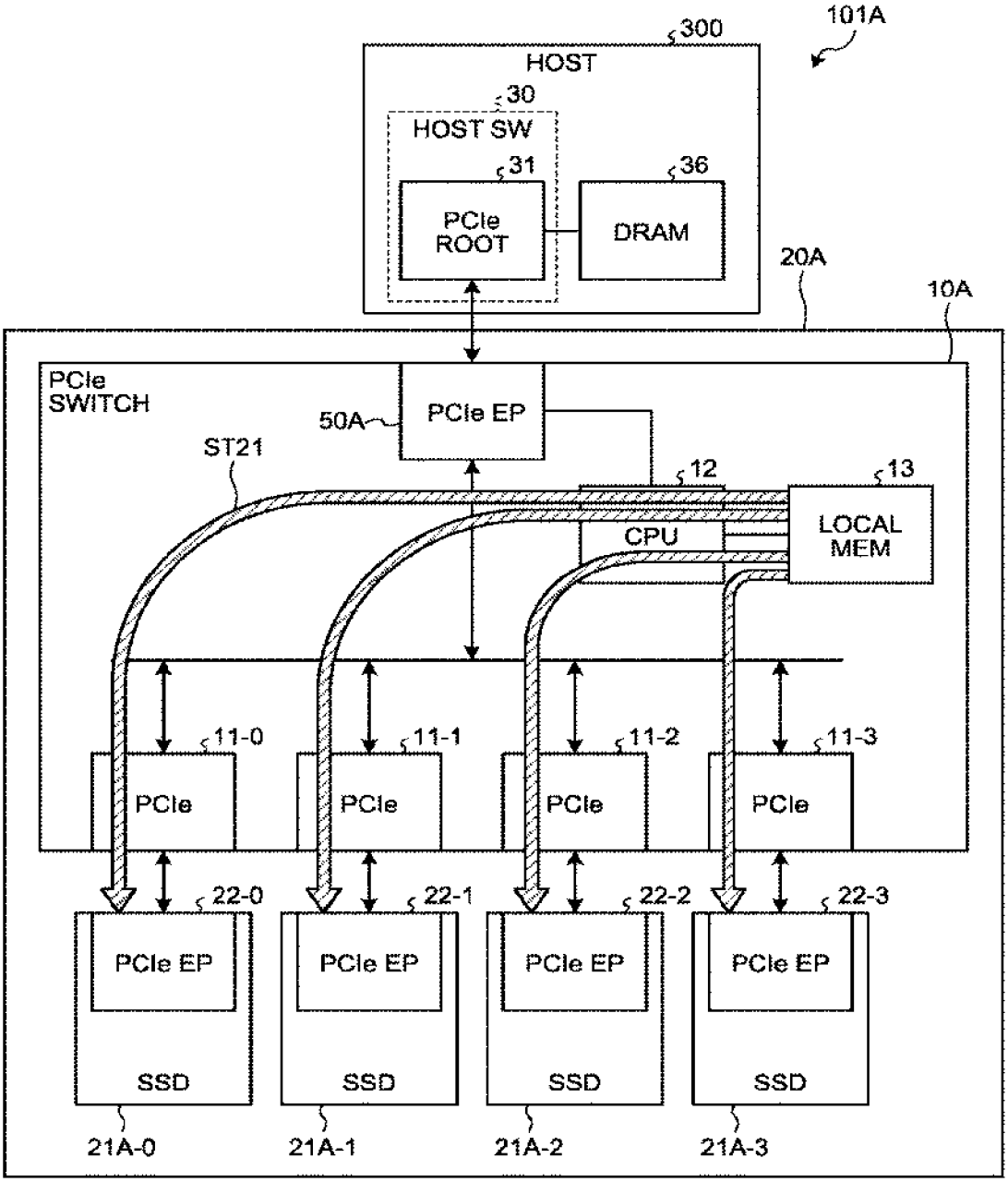
Figure 4D:
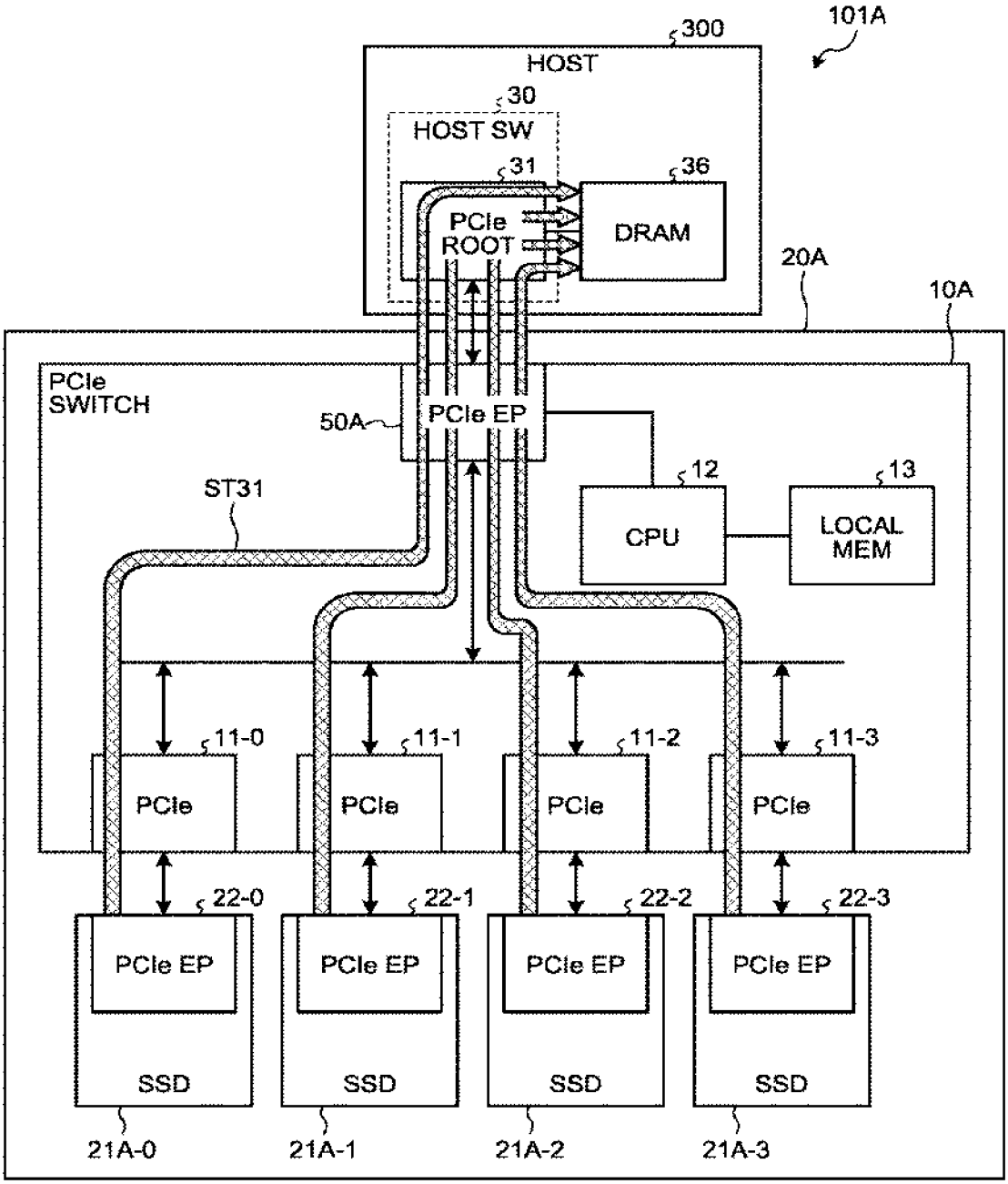
Figure 4E:
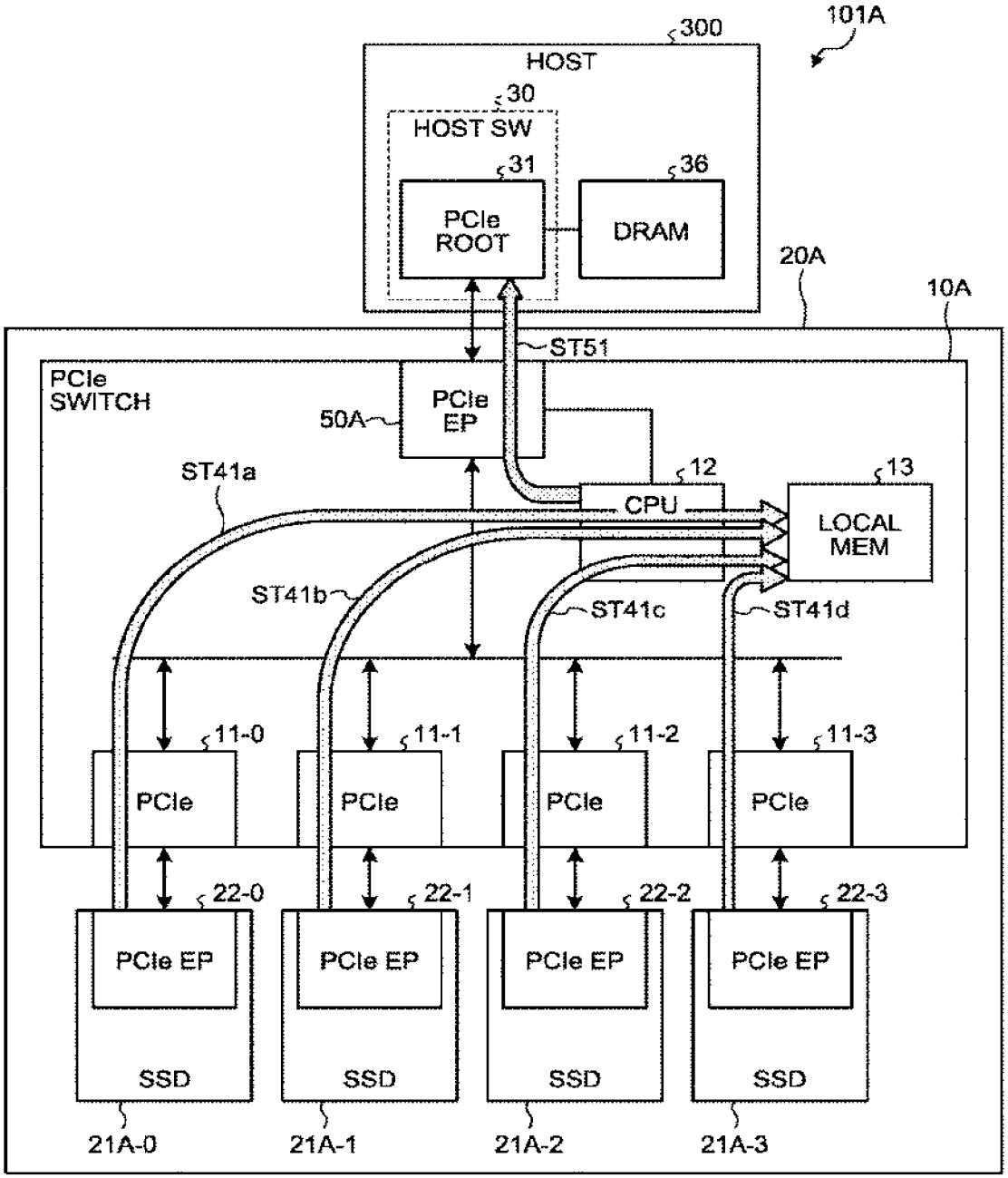

(FIGS. 4B and 4C)

When the doorbell of each EP is updated, each EP fetches its own SQ entry and PRP developed in the local memory 13 (ST11 and ST21) and performs a process corresponding to the command.

(FIG. 4D)

In this case, the EPs (SSDs 21A-0 to 21A-3) operate in parallel. For example, when the command from the host 300 is a read command, each EP transmits data to the host memory (DRAM 36) on the basis of the PRP (ST31).

(FIG. 4E)

When command processing ends, each EP updates the CQ entry in the local memory 13 and updates the doorbell in the local memory 13 (ST41a to ST41d). Then, when all of the processes distributed to each EP are completed, the PCIe switch 10A updates the CQ entry in the DRAM 36 which is a host memory and updates the doorbell in the DRAM 36 (ST51). The process in ST31 and ST41a to ST41d, which is the process of each EP, is independently performed by each EP.

Figure 5A:
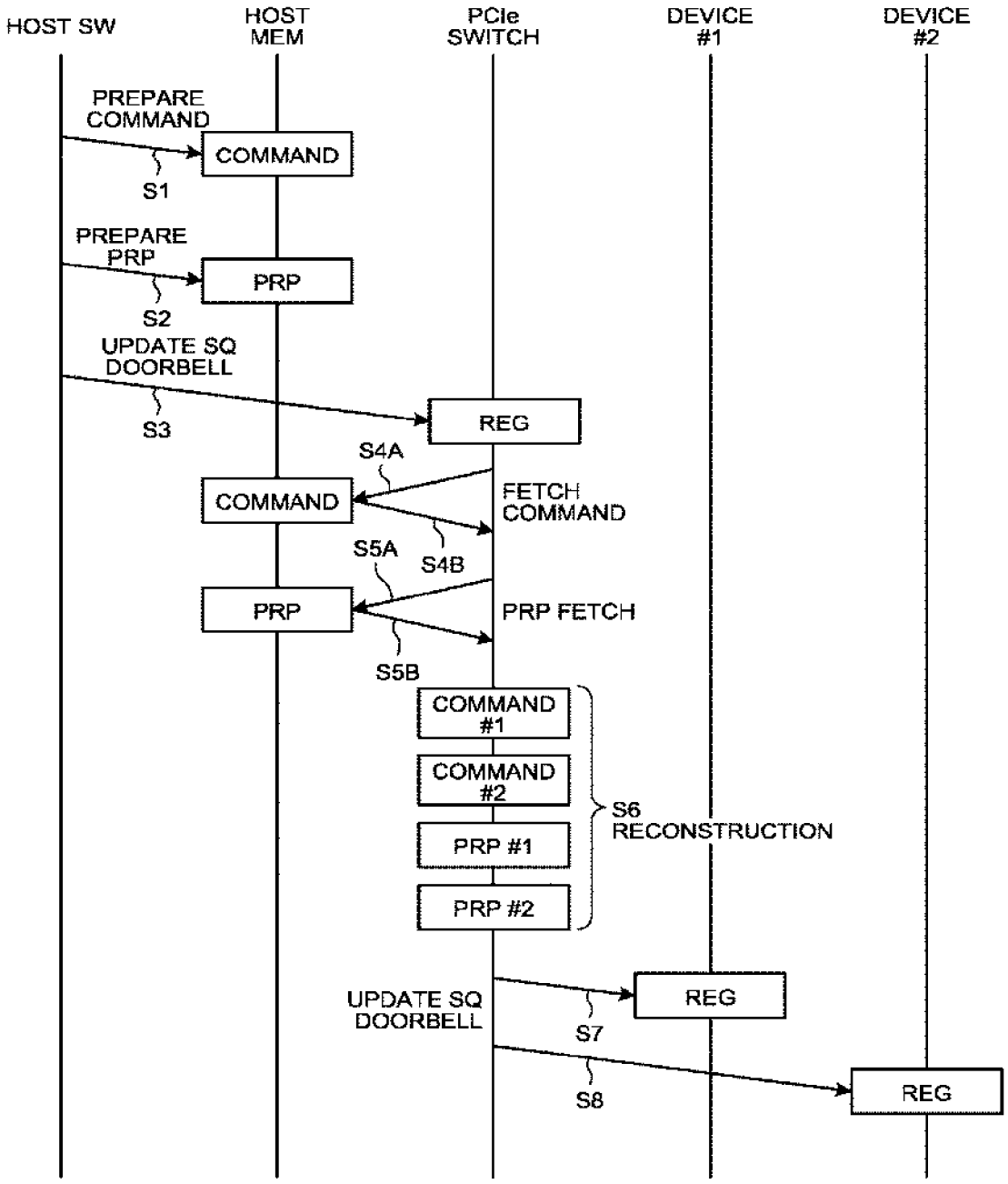
FIGS. 5A to 5C are sequence diagrams illustrating the operation procedure of the storage system according to the first embodiment.
Figure 5B:
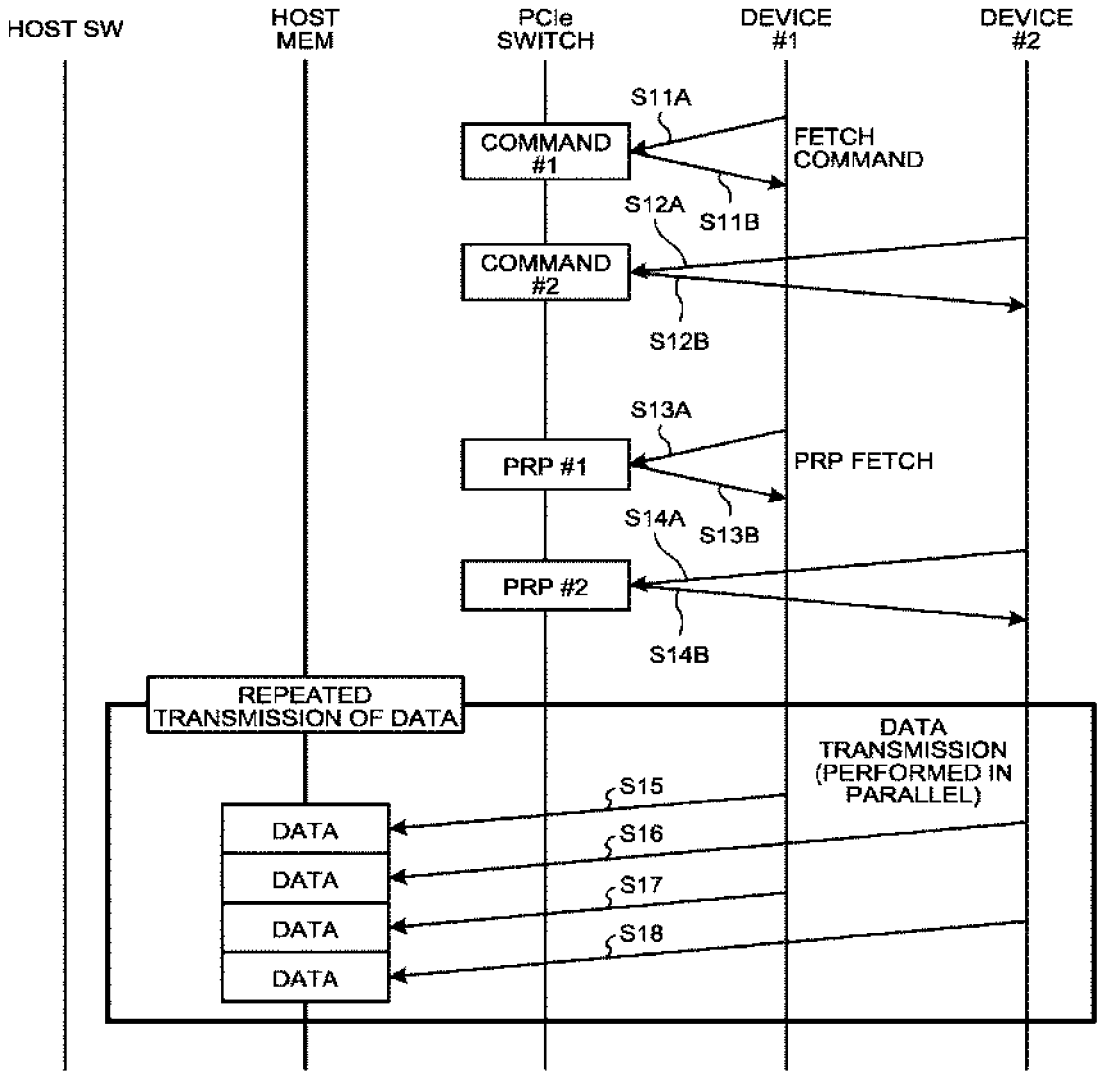
Figure 5C:
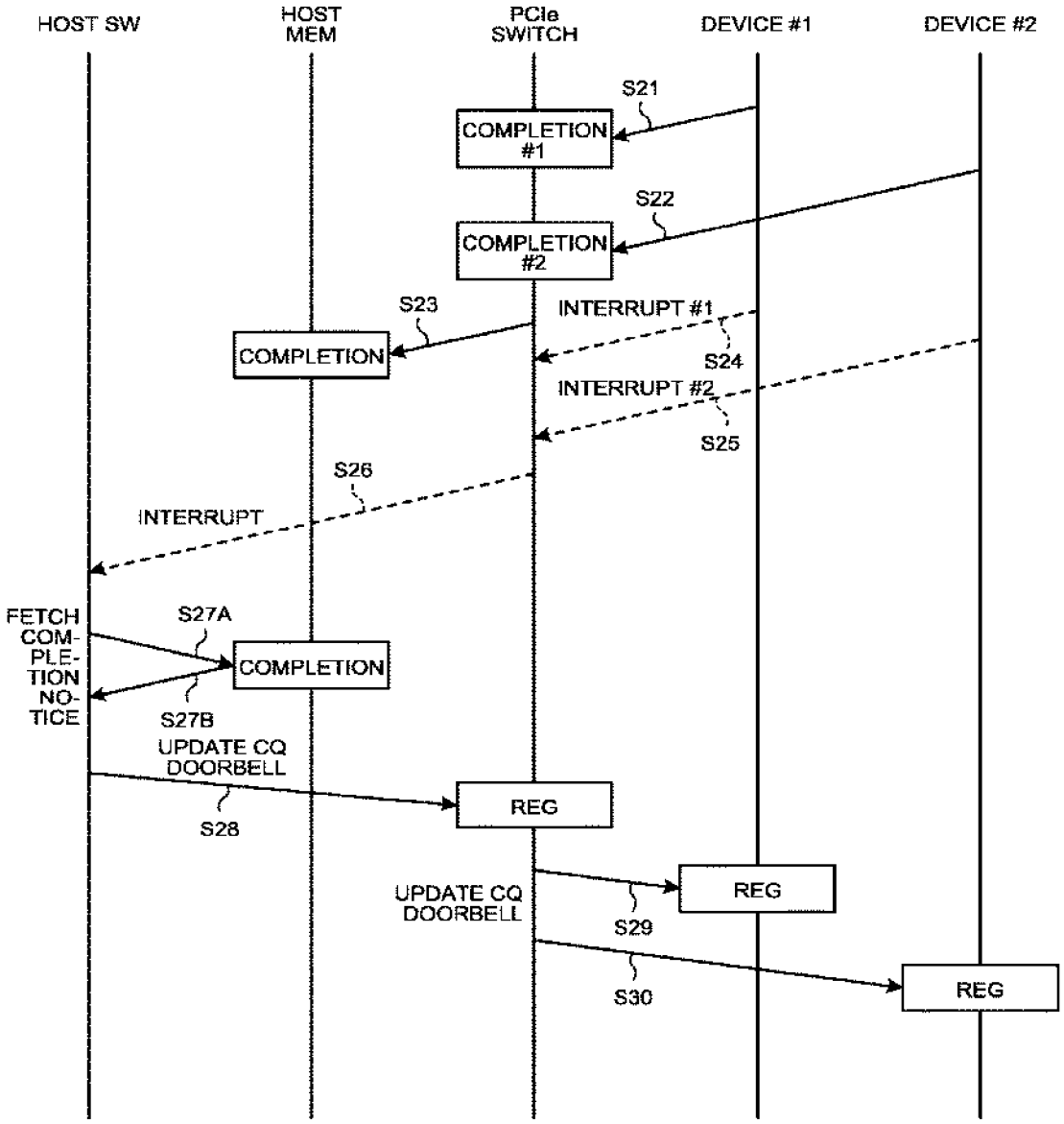

FIGS. 5A to 5C are sequence diagrams illustrating the operation procedure of the storage system according to the first embodiment. In FIGS. SA to 5C, the first SSD among the SSDs 21A-0 to 21A-3 is described as a device #1 and the second SSD among the SSDs 21A-0 to 21A-3 is described as a device #2. Here, the DRAM 36 is described as a host memory (host Mem).

(FIG. 5A)

The host SW 30 prepares a command and stores the command in the host Mem (S1). In addition, the host SW 30 prepares a PRP and stores the PRP in the host Mem (S2). The host SW 30 updates the doorbell (SQ doorbell) of the SQ entry stored in the NVMe registers 54 of the PCIe switch 10A (S3).

Then, the PCIe switch 10A fetches the command in the host Mem (S4A and S4B). The PCIe switch 10A fetches the PRP in the host Mem (S5A and S5B).

Then, the PCIe switch 10A reconstructs the fetched command as a command #1 and a command #2. In addition, the PCIe switch 10A reconstructs the fetched PRP as a PRP #1 and a PRP #2 (S6). The command #1 is an NVMe command to be transmitted to the device #1 and the command #2 is an NVMe command to be transmitted to the device #2. The PRP #1 is a PRP list to be transmitted to the device #1 and the PRP #2 is a PRP list to be transmitted to the device #2. The commands #1 and #2 and the PRPs #1 and #2 are stored in the local memory 13.

When the devices #1 and #2 correspond to the controller memory buffer, the commands #1 and #2 and the PRPs #1 and #2 are preferably created in the memories of the devices #1 and #2 in order to shorten latency.

After reconstructing the command and the PRP list, the PCIe switch 10A updates the doorbells of the SQ entries stored in the registers of the devices #1 and #2 (S7 and S8).

(FIG. 5B)

Then, the device #1 fetches the command #1 in the PCIe switch 10A (S11A and S11B). The device #2 fetches the command #2 in the PCIe switch 10A (S12A and S12B).

The device #1 fetches the PRP #1 in the PCIe switch 10A (S13A and S13B). The device #2 fetches the PRP #2 in the PCIe switch 10A (S14A and S14B). When the commands #1 and #2 and the PRPs #1 and #2 have been created in the memories of the devices #1 and #2, the process in S13A, S13B, S14A, and S14B ends in the devices #1 and #2.

Then, the devices #1 and #2 performs data transmission. The data transmission processes are performed in parallel by the devices #1 and #2 (S15 to S18). In other words, the devices #1 and #2 perform their own data transmission processes without being affected by other devices.

(FIG. 5C)

When completing the data transmission, the device #1 transmits completion #1 to the PCIe switch 10A (S21). When completing the data transmission, the device #1 transmits completion #2 to the PCIe switch 10A (S22). The completion #1 and the completion #2 are the content of the process corresponding to the command. When receiving all of the completion #1 and the completion #2 from the devices #1 and #2, the PCIe switch 10A transmits the completion #1 and the completion #2 to the host Mem (S23).

When completing the transmission of the completion #1, the device #1 transmits interrupt #1 to the PCIe switch 10A (S24). When completing the transmission of the completion #2, the device #2 transmits interrupt #2 to the PCIe switch 10A (S25). The interrupt #1 and the interrupt #2 are used to notify that the transmission of the completion #1 and the completion #2 has been completed. When receiving all of the interrupt #1 and the interrupt #2 from the devices #1 and #2, the PCIe switch 10A transmits the interrupt #1 and the interrupt #2 to the host SW 30 (S26).

Then, the host SW 30 fetches completion which is a command completion notice from the host Mem (S27A and S27B). Then, the host SW 30 updates the doorbell (CQ doorbell) of the CQ entry stored in the NVMe registers 54 of the PCIe switch 10A (S28). Then, the host SW 30 notifies the PCIe switch 10A that the completion in the host Mem has been read.

Then, the PCIe switch 10A updates the doorbell of the CQ entry stored in the register of the device #1 (S29). Then, the PCIe switch 10A notifies the device #1 that the completion #1 in the PCIe switch 10A has been read. The PCIe switch 10A updates the doorbell of the CQ entry stored in the register of the device #2 (S30). Then, the PCIe switch 10A notifies the device #2 that the completion #2 in the PCIe switch 10A has been read.

As such, the PCIe switch 10A formats (reconstructs) the SQ entry or the PRP list prepared by the host 300, notifies each EP of SQ update (the update of the doorbell of the SQ entry), and notifies the host 300 of CQ update in synchronization with the CQ update (the update of the doorbell of the CQ entry) of all of the EPs. The PRP is managed, for example, in a page size unit. Therefore, when the position of start LBA and a transmission size are known, it is easy to perform reconstruction for each EP.

A storage device having a native PCI express (PCIe) interface according to the related art is based on the standard in which it is assumed that the PCIe interface connects a root complex and an endpoint in a peer-to-peer manner, which makes it difficult to construct a storage array. In the storage device according to the related art, the topology of the storage array is configured through a PCIe switch. Therefore, it is possible to connect a plurality of PCIe interface drives, but the host needs to manage the connected physical devices.

In the first embodiment, in the topology in which the host 300 having the PCIe interface is connected to a plurality of PCIe/NVMe devices (SSDs 21A-0 to 21A-3) through the PCIe switch 10A, the host 300 regards the PCIe switch 10A as a PCIe endpoint. Therefore, the PCIe switch 10A relays a request from the host 300 to the PCIe/NVMe device, using the NVMe registers 54.

The PCIe switch 10A distributes access from the host 300 to a plurality of PCIe/NVMe devices. Therefore, it is possible to construct a storage array using a plurality of PCIe/NVMe devices with a simple structure, while reducing a burden on the host 300. In addition, since the existing devices can be used as the host 300 and the PCIe/NVMe device, it is possible to achieve a high-capacity storage array using a plurality of PCIe/NVMe device with a low cost. In addition, for the SSDs 21A-0 to 21A-3, a plurality of relatively inexpensive consumer-oriented controllers are connected to construct a high-speed and high-capacity storage array.

Second Embodiment

Next, a second embodiment will be described with reference to FIGS. 6 to 8C. In the second embodiment, the PCIe switch 10X does not have an NVMe function and manages each EP. Among a plurality of PCIe/NVMe devices, a master PCIe/NVMe device has an NVMe function.

Figure 6:
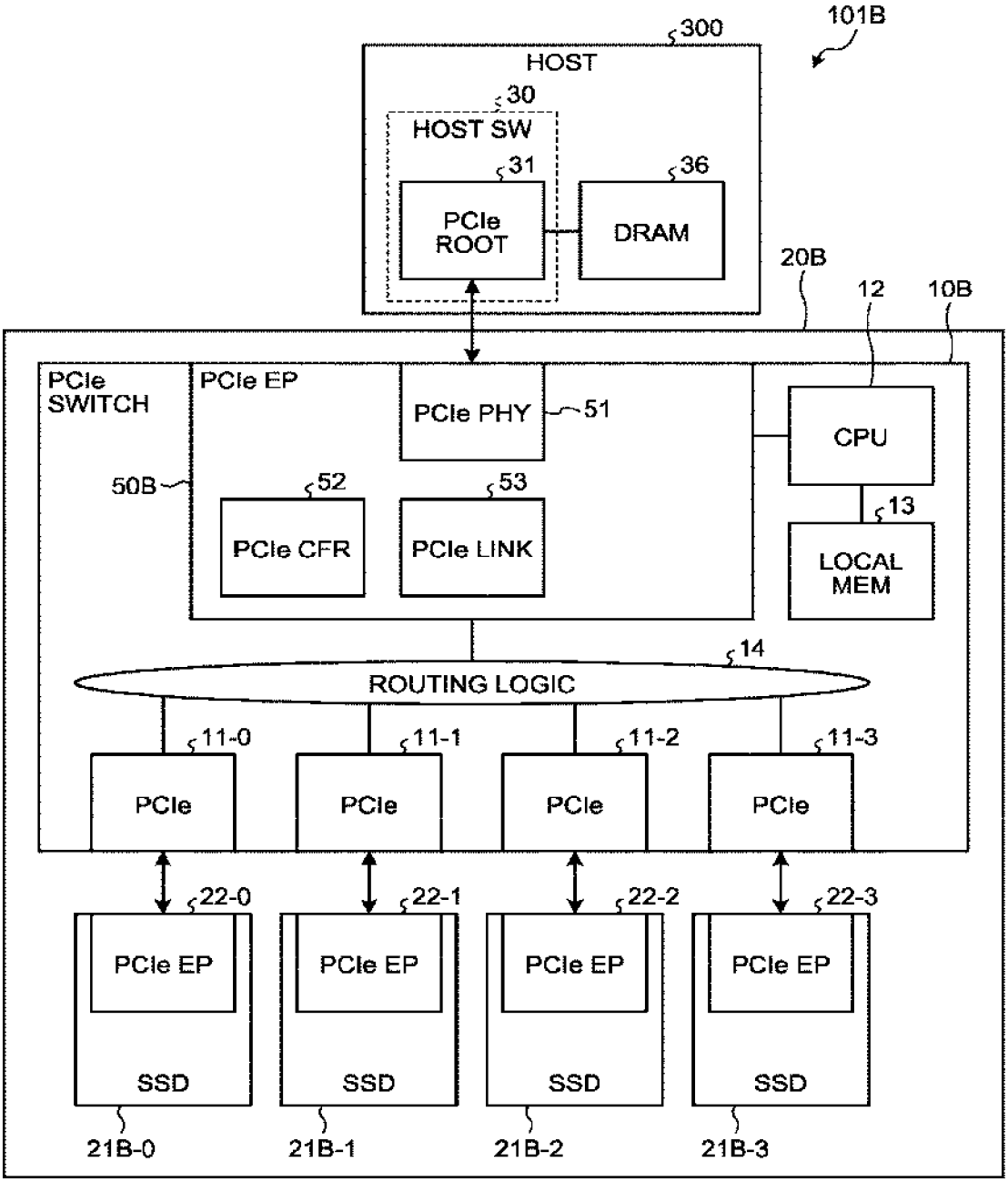
FIG. 6 is a diagram illustrating an example of the structure of a PCIe switch according to a second embodiment.

FIG. 6 is a diagram illustrating an example of the structure of a PCIe switch according to the second embodiment. FIG. 6 illustrates the structure of a storage system 101B which is an example of the storage system 101X. In addition, FIG. 6 illustrates the structure of a PCIe switch 10B which is an example of the PCIe switch 10X. SSDs 21B-0 to 21B-3 are an example of the SSDs 21X-0 to 21X-3, respectively. Among the components illustrated in FIG. 6, components having the same functions as those in the PCIe switch 10A according to the first embodiment illustrated in FIG. 2 are denoted by the same reference numerals and the description thereof will not be repeated.

An SSD system (memory device) 20B connected to the host 300 includes the PCIe switch 10B and the SSDs 21B-0 to 21B-3. The PCIe switch 10B is connected to the SSDs 21B-0 to 21B-3.

The PCIe switch 10B includes a PCIe EP 50B which is recognized as a PCIe endpoint by the host 300, a CPU 12, and a local memory 13. The PCIe EP 50B performs a process corresponding to instruction information from the host 300 or the CPU 12. The PCIe EP 50B includes a PCIe PHY 51, a PCIe CFR 52, and a PCIe link 53. As such, the PCIe EP 50B according to this embodiment does not include the NVMe registers 54.

In addition, the PCIe switch 10B includes a routing logic 14 and a plurality of PCIes (second ports) 11-0, 11-1, 11-2, and 11-3 which are based on the PCIe/NVMe standard and can be connected to the plurality of SSDs 21B-O to 21B-3, respectively.

The PCIe switch 10B is formed by, for example, one chip. The PCIe switch 10B may be formed by hardware or a combination of hardware and software. For example, the PCIe EP 50B or the routing logic 14 is formed by hardware.

The CPU 12 is connected to the PCIe EP 50B and the local memory 13. In addition, the PCIe EP 50B is connected to the routing logic 14. The CPU 12 controls the PCIe EP 50B and the routing logic 14, using data stored in the local memory 13 or software stored in a certain memory. The CPU 12 transmits instruction information to the PCIe EP 50B and the routing logic 14, on the basis of commands transmitted from the host 300.

The SSDs 21B-0 to 21B-3 include PCIe EPs 22-0 to 22-3, respectively. The PCIe EP 22-0 of the SSD 21B-0 is connected to the PCIe 11-0 of the PCIe switch 10B through a bus. The PCIe EP 22-1 of the SSD 21B-1 is connected to the PCIe 11-1 of the PCIe switch 10B through the bus. The PCIe EP 22-2 of the SSD 21B-2 is connected to the PCIe 11-2 of the PCIe switch 10B through the bus. The PCIe EP 22-3 of the SSD 21B-3 is connected to the PCIe 11-3 of the PCIe switch 10B through the bus. The PCIes 11-0 to 11-3 transmit and receive data to and from the PCIe EPs 22-0 to 22-3 of the SSDs 21B-0 to 21B-3 through the PCIe bus.

In this embodiment, a drive port which is a master is allocated to any one of the PCIes 11-0 to 11-3. NVMe ports which are accessed by the host 300 are integrated into a drive connected to the master drive port. Hereinafter, a case in which the PCIe 11-0 is a master drive port and the SSD 21B-0 is a master drive will be described.

In the storage system 101B, the SSD 21B-0 which is a master drive performs a process which does not need to be distributed to each EP such as admin command processing. When an LBA range which is treated by a command issued by the host 300 is beyond the management range of the master drive, the master drive requests other drives to perform a process. The master drive or the CPU 12 of the PCIe switch 10B performs the synchronization of the update of a CQ entry or an interrupt process. In the following description, in some cases, the SSD 21B-0 which is the master drive is referred to as a master SSD. In addition, in some cases, the SSDs 21B-1 to 21B-3 other than the master SSD are referred to as the other SSDs.

Next, the operation procedure of the storage system 101B including the PCIe switch 10B will be described. FIGS. 7A to 7G are diagrams illustrating the operation procedure of the storage system according to the second embodiment. The description of the same processes as those illustrated in FIGS. 4A to 4E among the processes illustrated in FIGS. 7A to 7G will not be repeated.

(FIG. 7A)

The master SSD has a doorbell in a register. Information indicating that the command from the host 300 has been updated is stored in the doorbell. When viewed from the host 300, only one PCIe switch 10B is connected as an SSD to the host 300. The host 300 generates a command to designate an address (PRP) for the PCIe switch 10B and stores the command in the DRAM 36. Then, the host 300 updates the doorbell in the master SSD (ST61).

(FIG. 7B)

Then, the master SSD fetches an SQ entry and a PRP in the DRAM 36 (ST71 and ST72).

(FIG. 7C)

Then, the master SSD determines whether the command is within the LBA range which the master SSD is in charge of. In other words, the master SSD determines whether the command is within the LBA range set in the master SSD. That is, the master SSD determines whether the command is addressed to the master SSD (the command corresponds to the master SSD). When the command involves access to the range which the master SSD is in charge of, the master SSD transmits its own command data. As such, when the command from the host 300 is within the range which the master SSD is in charge of, the master SSD distributes a process corresponding to the command to itself.

On the other hand, when the command involves access to the range which the master SSD is not in charge of, the master SSD updates the doorbells of the other SSDs (the other nodes) and distributes the process to the other SSDs. In other words, when the command from the host 300 is beyond the range which the master SSD is in charge of, the master SSD updates the doorbells of the other SSDs (any one of the predetermined SSDs 21B-1 to 21B-3). Then, the master SSD transmits the command that is beyond its own range to the other SSDs (ST81). As such, when the command from the host 300 is beyond the range which the master SSD is in charge of, the master SSD distributes a process corresponding to the command to the other SSDs.

(FIG. 7D)

Then, the other SSDs fetch the SQ entry and the PRP of the host 300, similarly to the master SSD (ST91A and ST92A). The other SSDs determine whether the command is within the LBA range which the other SSDs are in charge of. In other words, the other SSDs determine whether the command is within the LBA range which is set in the other SSD. That is, the other SSDs determine whether the command is addressed to the other SSDs (the command corresponds to the other SSDs). When the command involves access to the range which the other SSDs are in charge of, the other SSDs transmit command data which the other SSDs are in charge of.

On the other hand, when the command involves access to the range which the other SSDs are not in charge of, the other SSDs update the doorbells of the other SSDs and distribute the process. In other words, when the command from the host 300 is beyond the range which the other SSDs are in charge of, the other SSDs update their own doorbells (the doorbells of predetermined SSDs). Then, each of the other SSDs transmits the command that is beyond its own range to the other SSDs.

For example, when the command is beyond the LBA range which the master SSD is in charge of, the master SSD transmits the command to the first SSD (for example, the SSD 21B-1). When the command is beyond the LBA range which the first SSD is in charge of, the first SSD transmits the command to the second SSD (for example, the SSD 21B-2). When the command is beyond the LBA range which the second SSD is in charge of, the second SSD transmits the command to the third SSD (for example, the SSD 21B-3).

The SQ entry and the PRP may be cached in the local memory 13 of the PCIe switch 10B in order to reduce the number of accesses to the same region of the host 300. In this case, each SSD fetches the SQ entry and the PRP in the PCIe switch 10B. Therefore, it is possible to minimize the band loss of the host 300.

(FIG. 7E)

Figure 7A:
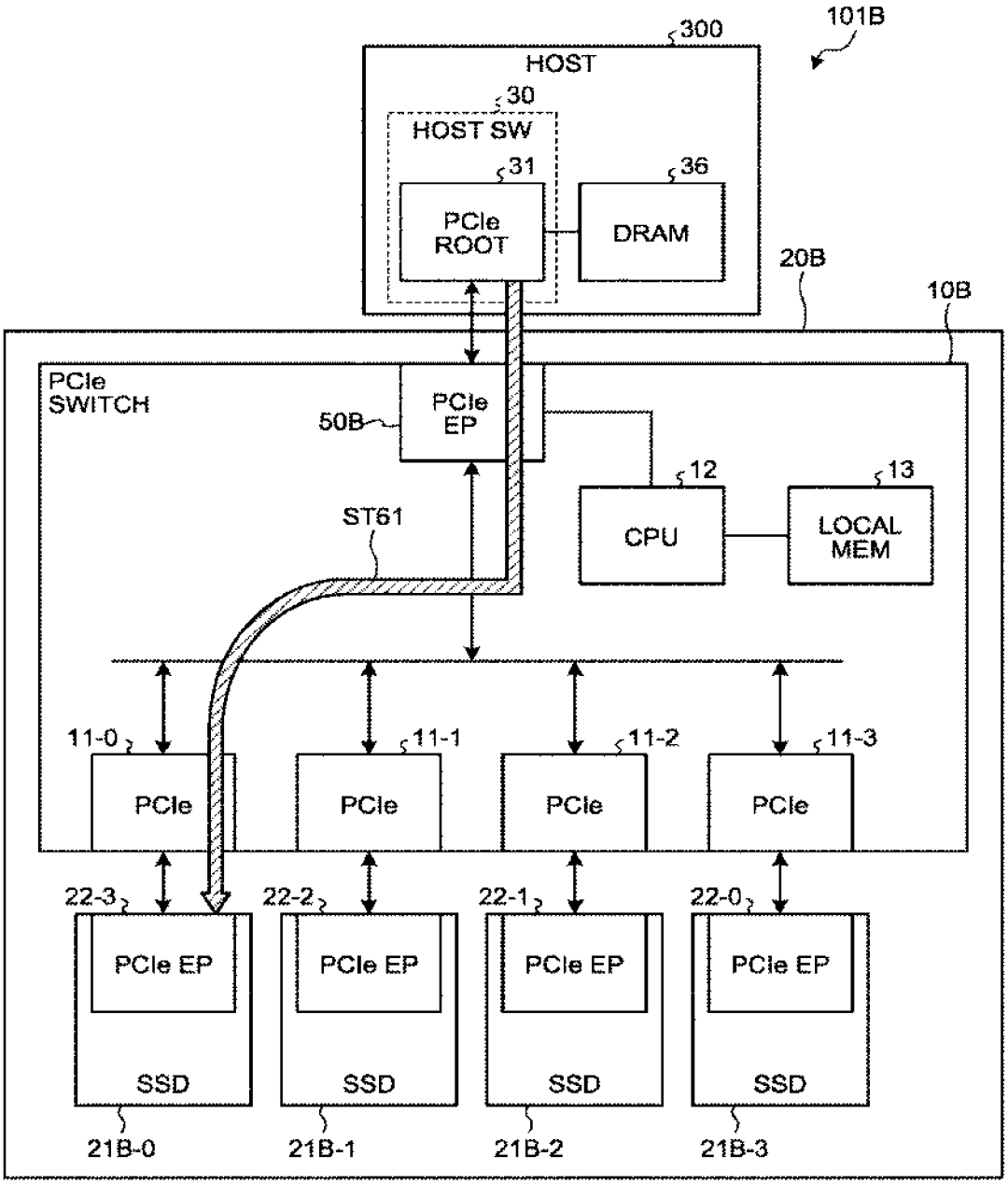
FIGS. 7A to 7G are diagrams illustrating the operation procedure of a storage system according to the second embodiment.
Figure 7B:
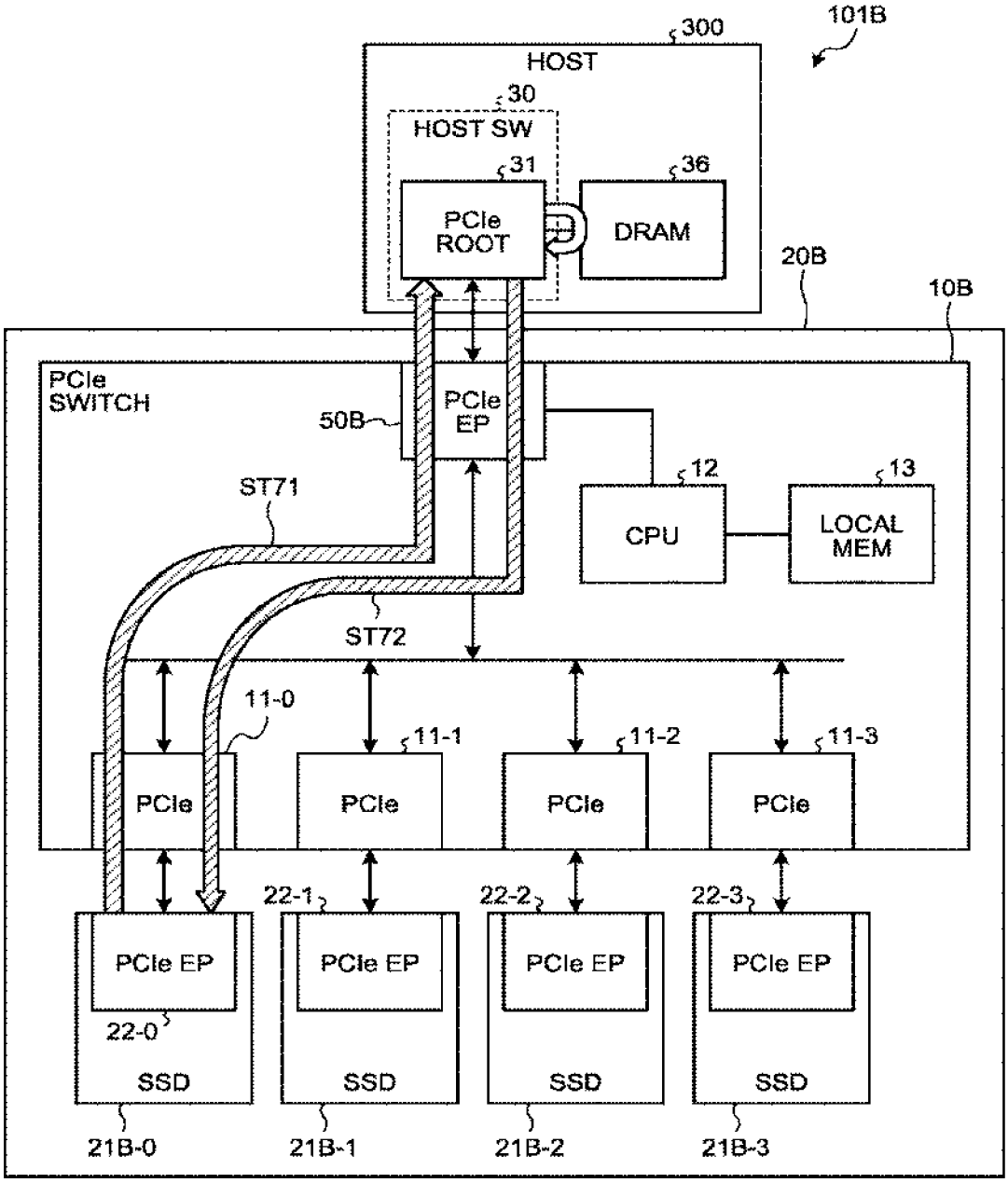
Figure 7C:
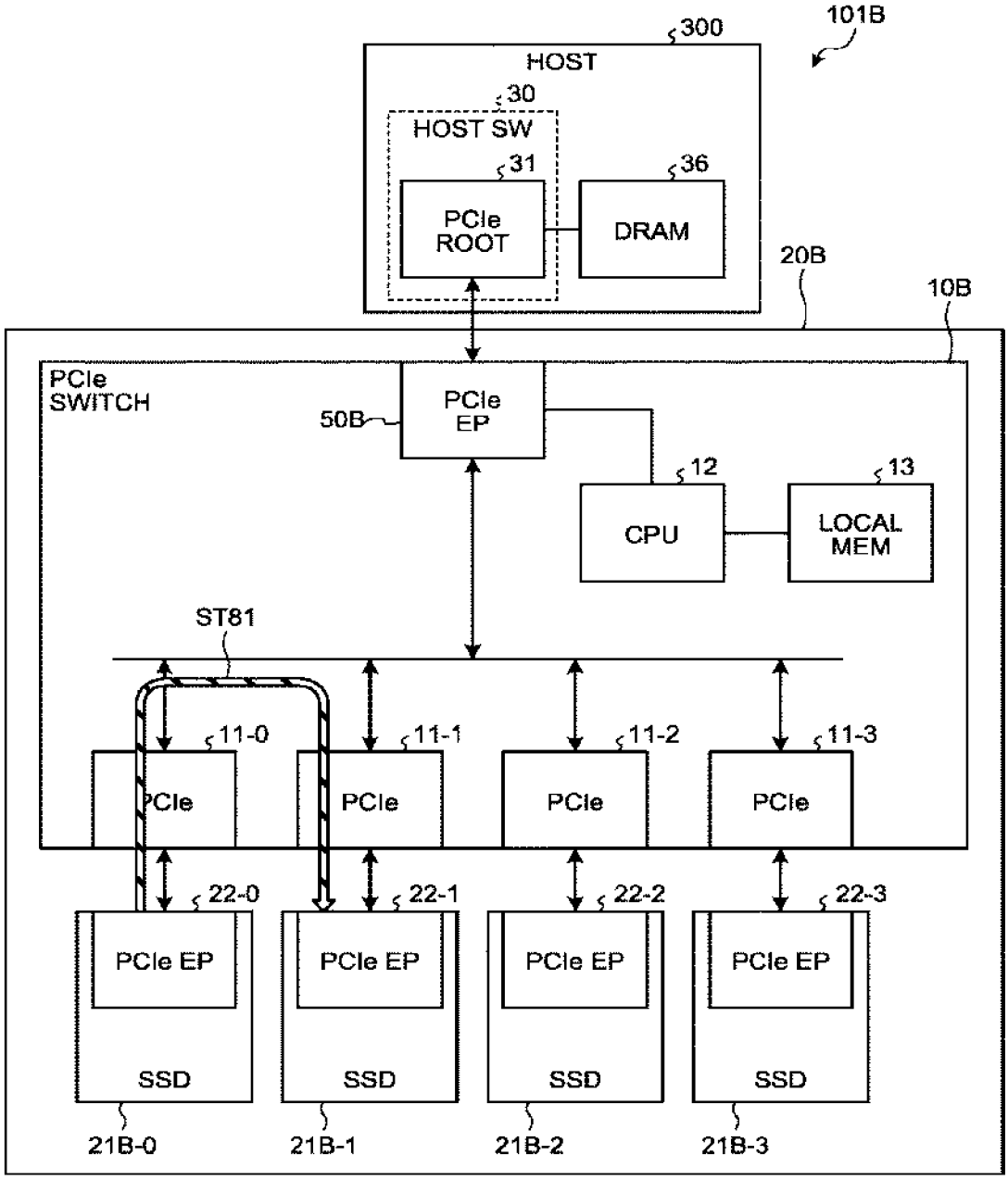
Figure 7D:
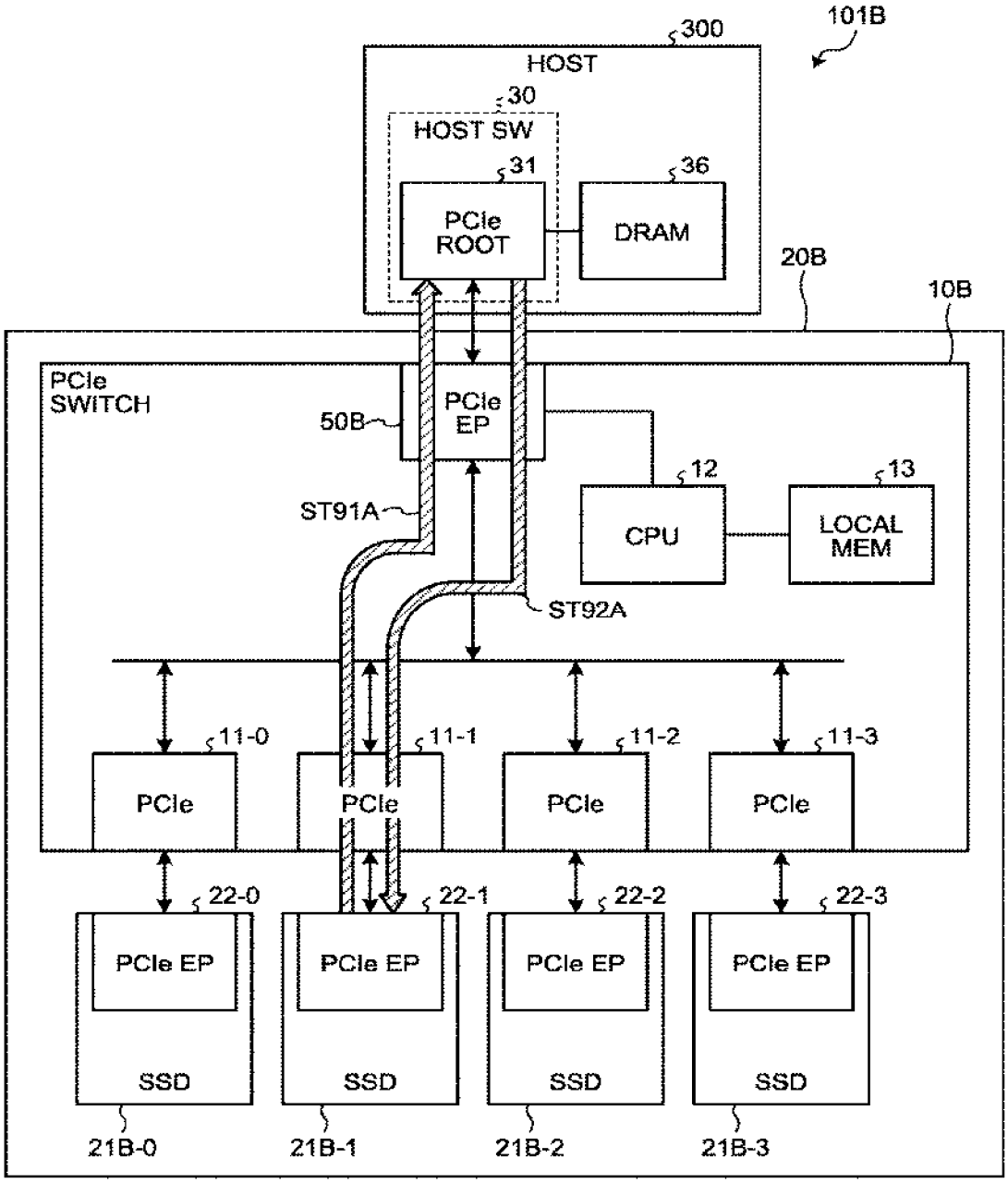
Figure 7E:
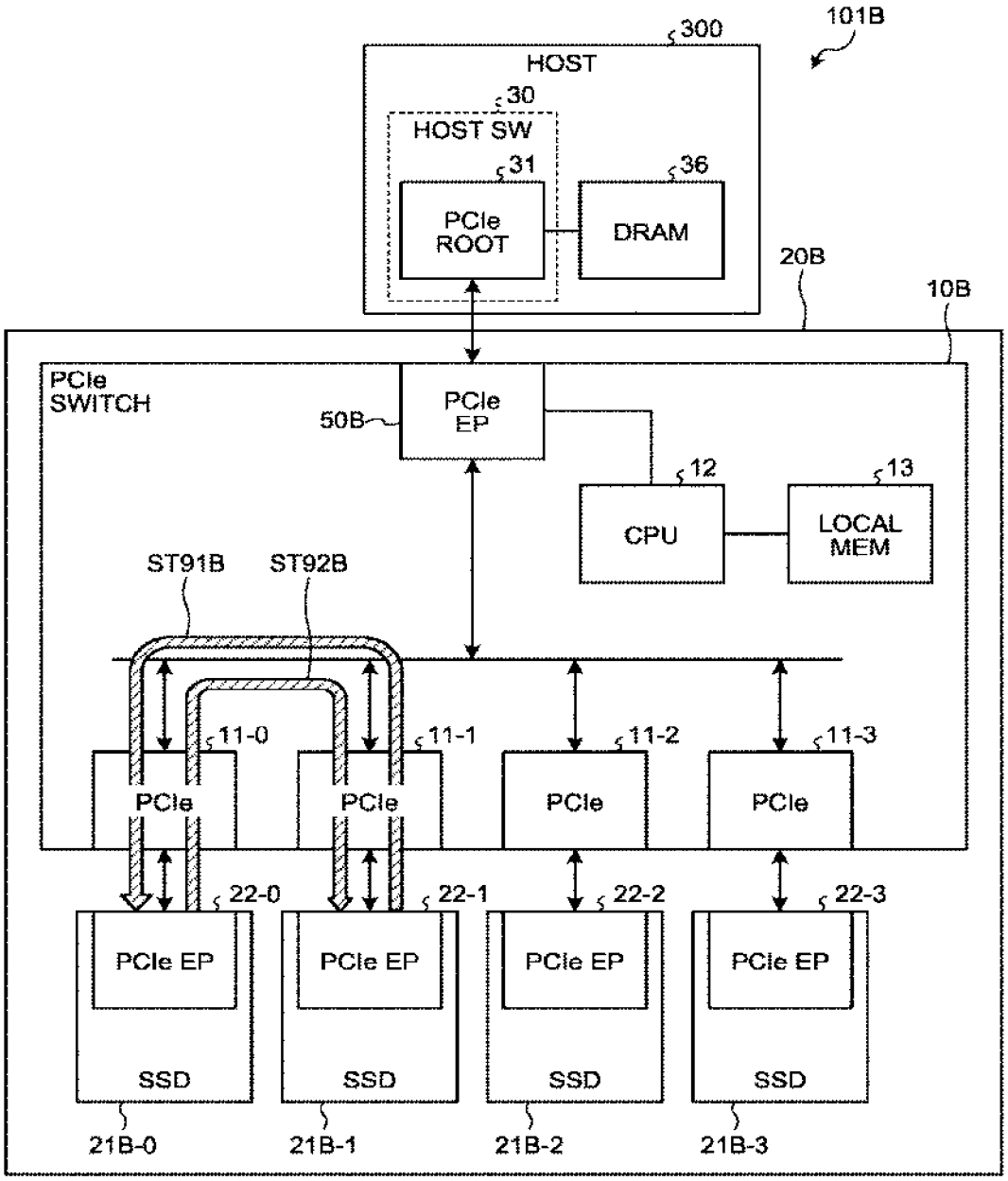
Figure 7F:
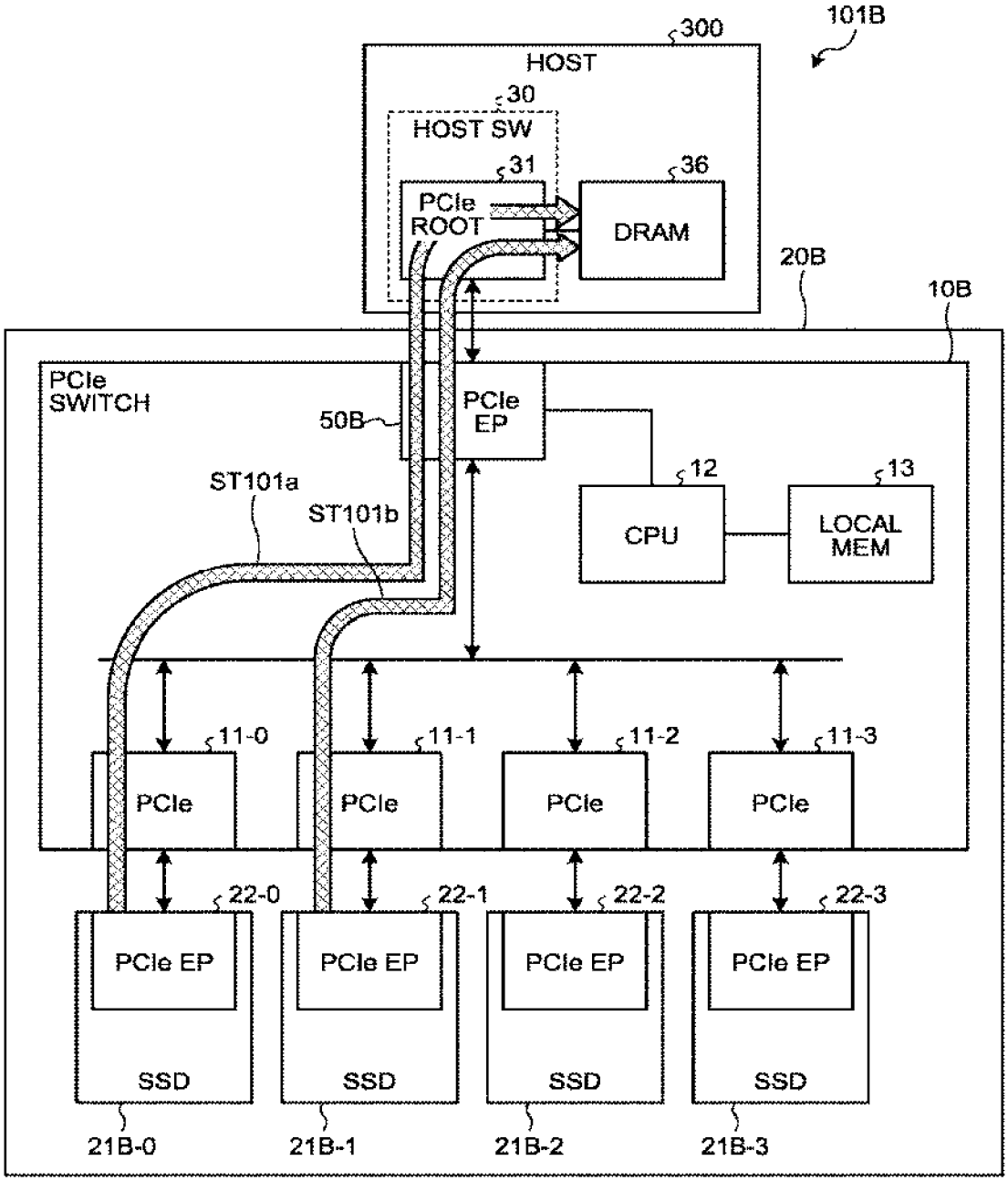
Figure 7G:
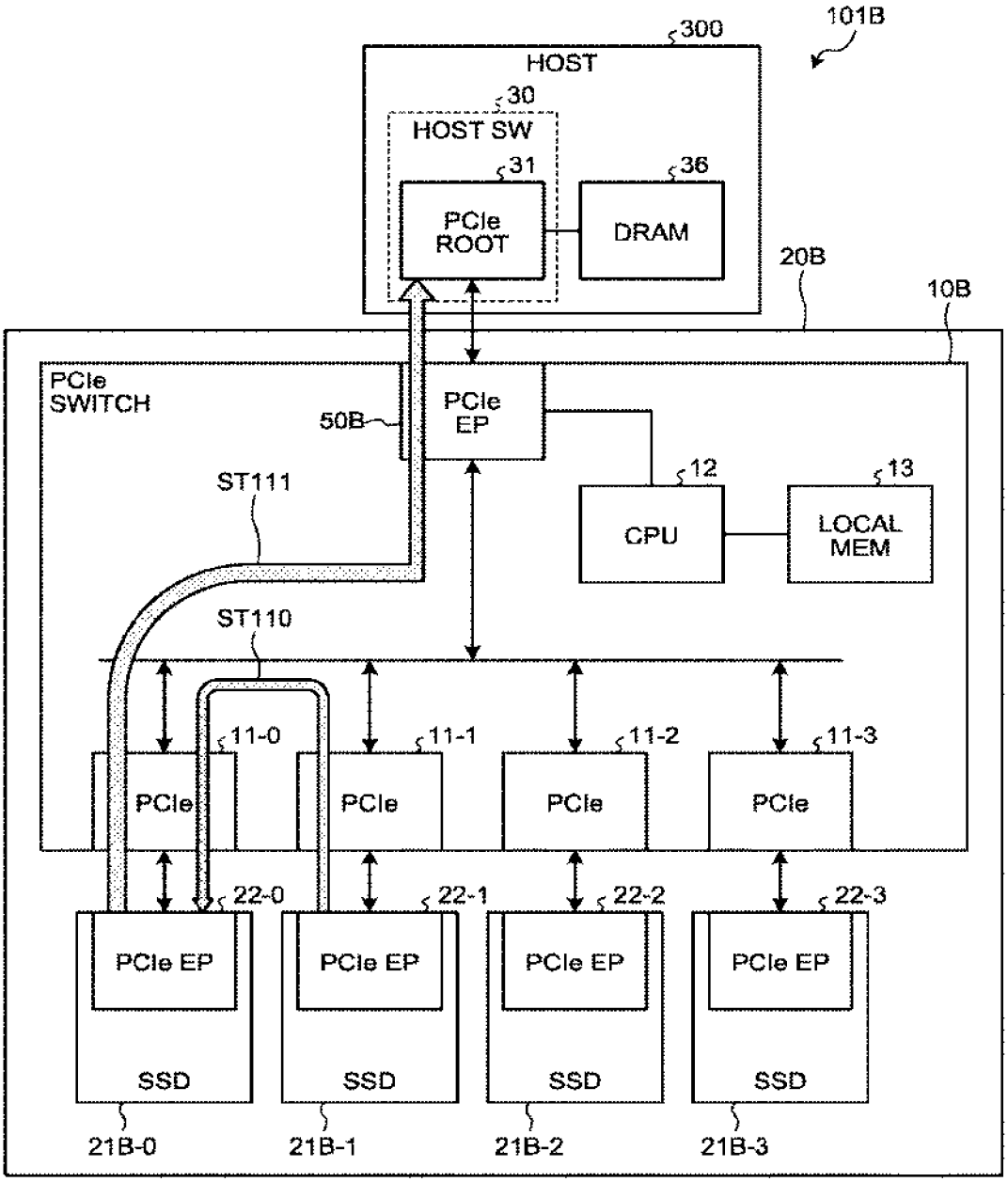

The other SSDs may fetch the SQ entry and the PRP, which have been fetched by the master SSD, through a local bus (ST91B and ST92B). FIG. 7D illustrates a case in which the other SSDs fetch the SQ entry and the PRP from the host 300 and FIG. 7E illustrates a case in which the other SSDs fetch the SQ entry and the PRP from the local memory 13 of the master SSD.

When fetching the SQ entry and the PRP from the master SSD, the other SSDs perform the same process as that described in FIG. 7D. That is, the other SSDs determine whether the command is within the LBA range which the other SSDs are in charge of. When the command involves access to the range which the other SSDs are in charge of, the other SSDs transmit data of the command which the other SSDs are in charge of. On the other hand, when the command involves access to the range which the other SSDs are not in charge of, the other SSDs update their own doorbells and distribute the process.

Since the other SSDs fetch the SQ entry and the PRP from the master SSD, it is possible to reduce the number of accesses to the host 300. In addition, each of the SSDs 21B-0 to 21B-3 uses the framework of the controller memory buffer to refer to the local memories of the other drives. Each of the SSDs 21B-0 to 21B-3 may use vendor-specific BAR allocation to directly read data from the other SSDs.

(FIG. 7F)

Each SSD acquires the PRP in the LBA range which each SSD is in charge of, using, for example, the method described in FIG. 7D or FIG. 7E. Therefore, the SSDs operate in parallel to transmit data to the host 300 (ST101a and ST101b). In other words, each SSD independently transmits data to the host 300.

(FIG. 7G)

The master drive performs a synchronization process for the CQ entry update process or the interrupt process. Finally, the master SSD notifies the host 300 of the completion of the process (ST110 and ST111). For example, when all of the processes distributed to each SSD are completed, the master SSD updates the CQ entry in the DRAM 36 which is the host memory and updates the doorbell of the DRAM 36.

Figure 8A:
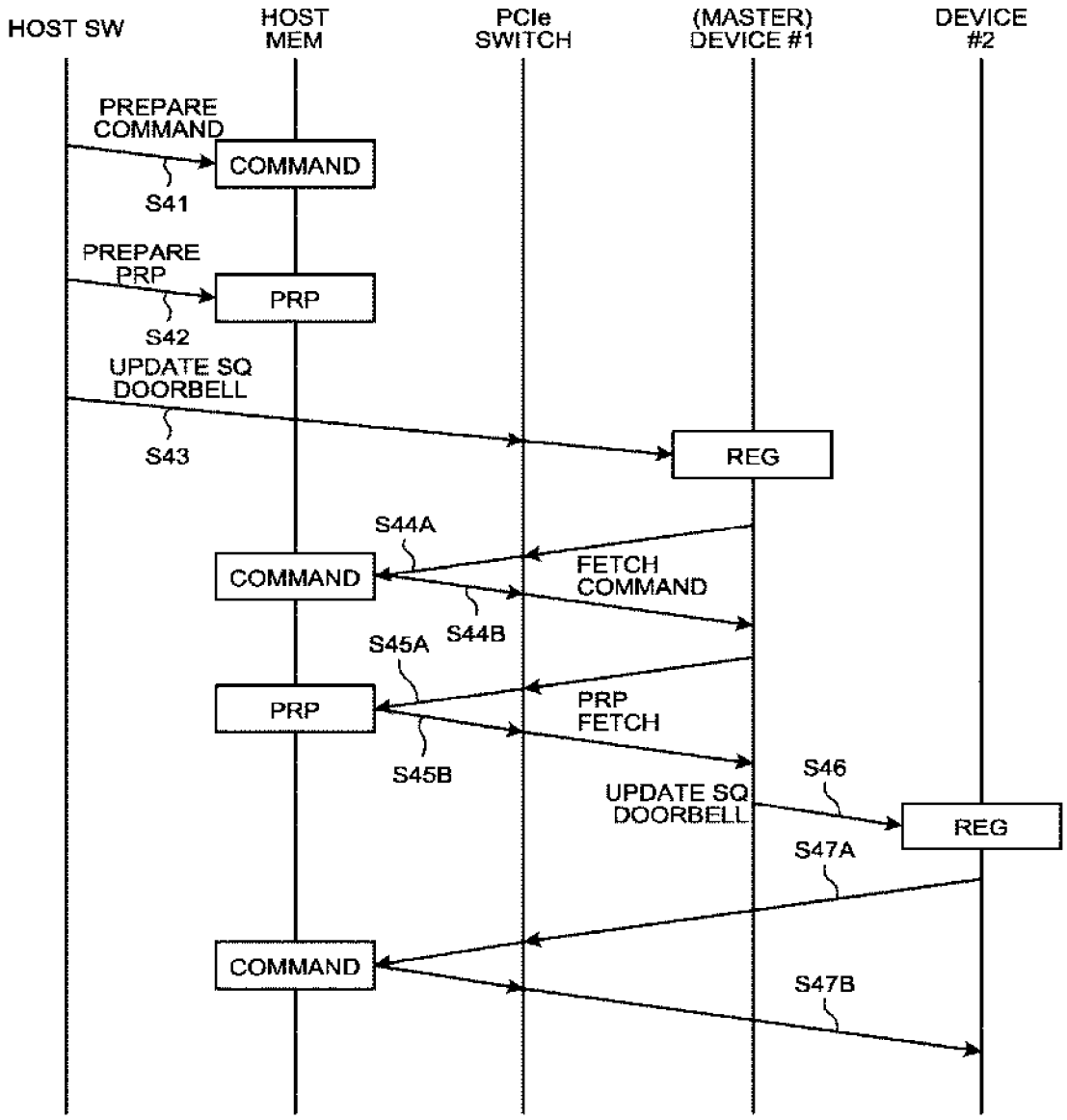
FIGS. 8A to 8C are diagrams illustrating the operation procedure of the storage system according to the second embodiment.
Figure 8B:
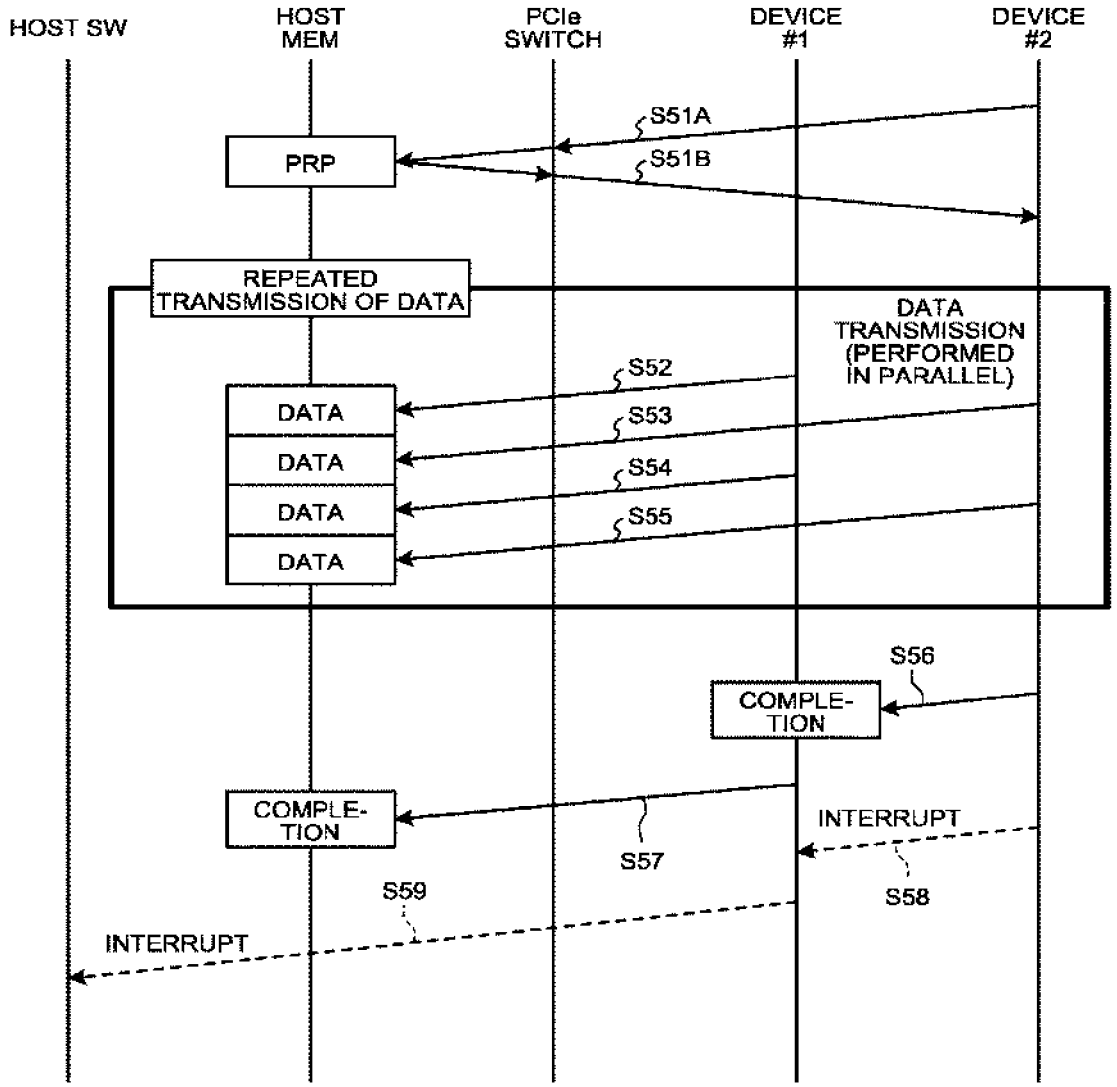
Figure 8C:
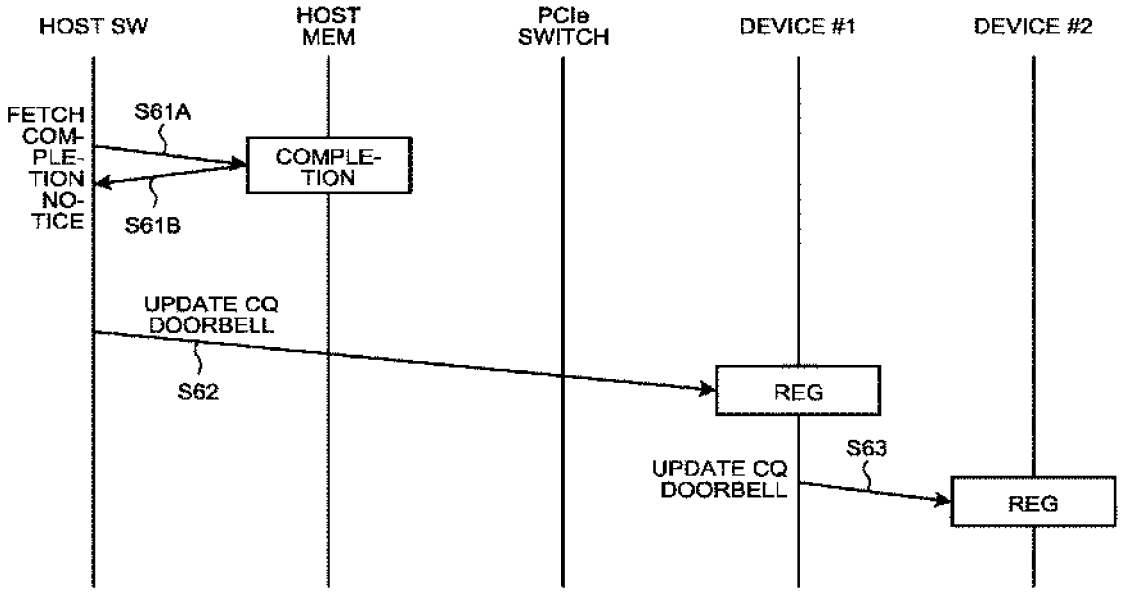

FIGS. 8A to 8C are sequence diagrams illustrating the operation procedure of the storage system according to the second embodiment. In FIGS. 8A to 8C, the master SSD among the SSDs 21B-0 to 21B-3 is described as a device #1 and the other SSDs are described as devices #2. Among the processes illustrated in FIGS. 8A to 8C, the description of the same processes as those described in FIGS. 5A to 5C will not be repeated.

(FIG. 8A)

The host SW 30 prepares a command and stores the command in the host Mem (S41). In addition, the host SW 30 prepares a PRP and stores the PRP in the host Mem (S42). The host SW 30 updates the doorbell (SQ doorbell) of the SQ entry stored in the register of the master SSD (device #1) (S43). At that time, the PCIe switch 10B transmits a doorbell update instruction transmitted from the host SW 30 to the master SSD.

Then, the master SSD fetches the command in the host Mem (S44A and S44B). In addition, the master SSD fetches the PRP in the host Mem (S45A and S45B).

When the command involves access to the range which the master SSD is in charge of, the master SSD transmits data of the command which the master SSD is in charge of.

When there is transmission which has not been completed in the master SSD, the master SSD updates the doorbell (SQ doorbell) of the SQ entry stored in the registers of the other SSDs (devices #2) (S46). In other words, when there is a command which the master SSD is not in charge of, the master SSD issues a data transmission request to the other SSDs. Then, the other SSDs fetch the command in the host Mem (S47A and S47B).

(FIG. 8B)

The other SSDs fetch the PRP in the host Mem (S51A and S51B). Then, the master SSD and the other SSDs (devices #1 and #2) perform data transmission. The data transmission processes are performed in parallel by the master SSD and the other SSDs (S52 to S55).

When the data transmission is completed, the other SSDs transmit a completion signal to the master SSD (S56). After collecting all of the completion signals from each SSD, the master SSD transmits a completion signal to the host SW 30 (S57). In addition, after the process of the master SSD is completed, the master SSD transmits the completion signal to the host SW 30.

When the transmission of the completion signal is completed, the other SSDs transmit interrupt signals to the master SSD (S58). After collecting all of the interrupt signals from each SSD, the master SSD transmits an interrupt signal to the host SW 30 (S59).

(FIG. 8C)

Then, the host SW 30 fetches the completion signal which is a command completion notice from the host Mem (S61A and S61B). Then, the host SW 30 updates the doorbell (CQ doorbell) of the CQ entry stored in the register of the master SSD (S62). Then, the host SW 30 notifies the master SSD that the completion signal in the host Mem has been read.

Then, the master SSD updates the doorbell (CQ doorbell) of the CQ entry stored in each of the registers of the other SSDs (S63). Then, the master SSD notifies the other SSDs that the completion signal in the other SSDs has been read.

As such, the PCIe switch 10B relays data transmission between the host 300 and the SSDs 21B-0 to 21B-3. Then, when the command is within the range which the master SSD is in charge of on the basis of the SQ entry or the PRP prepared by the host 300, the master SSD transmits data to the host 300. When the command is beyond the range which the master SSD is in charge of, the master SSD notifies the host 300 of the SQ update of the other SSDs and notifies the host 300 of the CQ update in synchronization with the CQ update of all of the SSDs.

As described in the first embodiment, the master SSD may reconstruct the SQ entry and the PRP list. In this case, the master SSD updates the doorbell of each SSD.

As such, in the second embodiment, in the topology in which the host 300 having the PCIe interface is connected to a plurality of PCIe/NVMe devices (SSDs 21B-0 to 21B-3) through the PCIe switch 10B, the host 300 regards the PCIe switch 10B as a PCIe endpoint. Therefore, the PCIe switch 10B relays a request from the host 300 to the master SSD. In addition, the master SSD distributes the request from the host 300 to any one of the SSDs.

Then, the PCIe switch 10B distributes access from the host 300 to a plurality of PCIe/NVMe devices. Therefore, it is possible to construct a storage array using a plurality of PCIe/NVMe devices with a simple structure, while reducing a burden on the host 300. In addition, since the existing devices can be used as the host 300 and the PCIe/NVMe device, it is possible to achieve a high-capacity storage array using a plurality of PCIe/NVMe device with a low cost.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A switch module comprising:

a first interface configured to be connected to a host in accordance with Peripheral Component Interconnect Express/Non-Volatile Memory Express (PCIe/NVMe) standard;

a plurality of second interfaces configured to be connected to a plurality of [storage devices] *solid state drives* (*SSDs*), respectively, in accordance with the PCIe/NVMe standard; and a controller *outside of the plurality of SSDs, the controller being* configured to make the host recognize the plurality of [storage devices] *SSDs* as a single storage device by:

obtaining a command issued by the host, the command designating a logical address range *and designating access target data on a logical-block-address* (*LBA*) *basis*; [and]

on the basis of the logical address range, *determining which one of the plurality of SSDs performs a process corresponding to the command; and* distributing the command to [at least] *the determined* one of the plurality of [storage devices] *SSDs*.

2. The switch module according to claim 1, wherein the controller is further configured to:

divide the command issued by the host into a first command and a second command;

distribute the first command to a first [storage device] *SSD* among the plurality of [storage devices] *SSDs*; and distribute the second command to a second [storage device] *SSD* among the plurality of [storage devices] *SSDs*.

3. The switch module according to claim 1, wherein the controller is configured to:

in a case that the command issued by the host designates a first logical address range, distribute the command as a first command to a first [storage device] *SSD* among the plurality of [storage devices] *SSDs*; and in a case that the command issued by the host designates a second logical address range, distribute the command as a second command to a second [storage device] *SSD* among the plurality of [storage devices] *SSDs*.

4. The switch [nodule] *module* according to claim 3, wherein the controller is further configured to:

receive a first completion notification from the first [storage device] *SSD* when the first [storage device] *SSD* completes executing the first command;

receive a second completion notification from the second [storage device] *SSD* when the second [storage device] *SSD* completes executing the second command; and after receiving both of the first completion notification and the second completion notification, transmit, to the host, a completion notification to notify that the command issued by the host is completed.

5. The switch module according to claim 3, further comprising:

an NVMe register that stores a door bell; and a memory, wherein the controller is further configured to:

when the host updates the door bell, fetch the command issued by the host and store the fetched command into the memory.

6. The switch module according to claim 5, wherein the controller is further configured to:

after storing the command into the memory, update a door bell of the [at least] *determined* one of the plurality of [storage devices] *SSDs* so that the [at least] *determined* one of the plurality of [storage devices] *SSDs* fetches the command from the memory.

7. The switch [nodule] *module* according to claim 1, wherein the command issued by the host is accompanied with a data transmission descriptor, wherein the controller is further configured to:

on the basis of the data transmission descriptor, inform the [at least] *determined* one of the plurality of [storage devices] *SSDs* of a location in a memory of the host to which the [at least] *determined* one of the plurality of [storage devices] *SSDs* is to access in accordance with the command.

8. The switch module according to claim 7, wherein in a case that the command issued by the host is a read command, the location in the memory of the host is a location into which the [at least] *determined* one of the plurality of [storage devices] *SSDs* is to write a *piece of* read data in accordance with the read command.

9. The switch module according to claim 7, wherein in a case that the command issued by the host is a write command, the location in the memory of the host is a location from which the [at least] *determined* one of the plurality of [storage devices] *SSDs* is to read a *piece of* write data in accordance with the write command.

10. The switch module according to claim 7, wherein the data transmission descriptor includes a plurality of entries, wherein the controller is configured to:

on the basis of an identifier to identify each of the plurality of entries, determine [a storage device] *an SSD* among the plurality of [storage devices] *SSDs* that the controller is to inform the location.

11. A method of controlling a plurality of [storage devices] *solid state drives SSDs*, each of the plurality of [storage devices] *SSDs* conforming to Peripheral Component Interconnect Express/Non-Volatile Memory Express (PCIe/NVMe) standard, the method comprising:

*making, by a controller outside of the plurality of SSDs, a host recognize the plurality of SSDs as a single storage device by:* obtaining a command issued by [a] *the* host that conforms to the PCIe/NVMe standard, the command designating a logical address range *and designating access target data on a logical-block-address* (*LBA*) *basis*;

on the basis of the logical address range, *determining which one of the plurality of SSDs performs a process corresponding to the command; and* distributing the command to [at least] *the determined* one of the plurality of [storage devices] *SSDs*; and allowing the host to recognize the plurality of [storage devices] *SSDs* as [a] *the* single storage device.

12. The method according to claim 11, further comprising:

dividing the command issued by the host into a first command and a second command;

distributing the first command to a first [storage device] *SSD* among the plurality of [storage devices] *SSDs*; and distributing the second command to a second [storage device] *SSD* among the plurality of [storage devices] *SSDs*.

13. The method according to claim 11, wherein distributing the command includes:

in a case that the command issued by the host designates a first logical address range, distributing the command as a first command to a first [storage device] *SSD* among the plurality of [storage devices] *SSDs*; and in a case that the command issued by the host designates a second logical address range, distributing the command as a second command to a second [storage device] *SSD* among the plurality of [storage devices] *SSDs*.

14. The method according to claim 13, further comprising:

receiving a first completion notification from the first [storage device] *SSD* when the first [storage device] *SSD* completes executing the first command;

receiving a second completion notification from the second [storage device] *SSD* when the second [storage device] *SSD* completes executing the second command; and after receiving both of the first completion notification and the second completion notification, transmitting, to the host, a completion notification to notify that the command issued by the host is completed.

15. The method according to claim 13, further comprising:

receiving, from the host, a request to update a door bell;

fetching, from a first memory of the host, the command issued by the host; and storing the fetched command into a second memory.

16. The method according to claim 15, further comprising:

after storing the command into the second memory, updating a door bell of the [at least] *determined* one of the plurality of [storage devices] *SSDs* so that the [at least] *determined* one of the plurality of [storage devices] *SSDs* fetches the command from the second memory.

17. The method according to claim 11, the command issued by the host being accompanied with a data transmission descriptor, the method further comprising:

on the basis of the data transmission descriptor, informing the [at least] *determined* one of the plurality of [storage devices] *SSDs* of a location in a memory of the host to which the [at least] *determined* one of the plurality of [storage devices] *SSDs* is to access in accordance with the command.

18. The method according to claim 17, wherein in a case that the command issued by the host is a read command, the location in the memory of the host is a location into which the [at least] *determined* one of the plurality of [storage devices] *SSDs* is to write a *piece of* read data in accordance with the read command.

19. The method according to claim 17, wherein in a case that the command issued by the host is a write command, the location in the memory of the host is a location from which the [at least] *determined* one of the plurality of [storage devices] *SSDs* is to read a *piece of* write data in accordance with the write command.

20. The method according to claim 17, the data transmission descriptor including a plurality of entries, the method further comprising:

on the basis of an identifier to identify each of the plurality of entries, determining [a storage device] *an SSD* among the plurality of [storage devices] *SSDs* that is to be informed of the location.

*21. A storage system comprising:*

*a plurality of solid state drives (SSDs); and*

*a controller outside of the plurality of SSDs, the controller including:*

*a first interface configured to be connected to a host, the host being configured to issue Non-Volatile Memory Express (NVMe) commands, the NVMe commands being commands based on NVMe standard; and*

*a plurality of second interfaces configured to be connected to the plurality of SSDs respectively, wherein*

*the controller is configured to allow the host to recognize the plurality of SSDs as a single storage device by:*

*obtaining a first NVMe command issued by the host, the first NVMe command indicating a logical address range;*

*on the basis of the logical address range, determining which one of the plurality of SSDs performs a process corresponding to the first NVMe command; and*

*issuing a second NVMe command that is based on the first NVMe command to the determined one of the plurality of SSDs, the second NVMe command designating the access target data on the LBA basis.*

*22. The storage system of claim 21, wherein*

*the controller is configured to allow the host to recognize the plurality of SSDs as a single SSD.*

*23. The storage system of claim 21, wherein*

*at least one of the plurality of SSDs includes a Peripheral Component Interconnect Express (PCIe) endpoint.*

*24. The storage system of claim 21, wherein*

*the controller is configured to:*

*in a case where the first NVMe command issued by the host indicates a first logical address range, issue the second NVMe command to a first SSD among the plurality of SSDs; and*

*in a case where the first NVMe command issued by the host indicates a second logical address range, issue the second NVMe command to a second SSD among the plurality of SSDs.*

*25. The storage system of claim 21, wherein*

*the controller is further configured to:*

*generate a first NVMe sub-command and a second NVMe sub-command on the basis of the first NVMe command issued by the host;*

*issue, as the second NVMe command, the first NVMe sub-command to a first SSD among the plurality of SSDs; and*

*issue, as the second NVMe command, the second NVMe sub-command to a second SSD among the plurality of SSDs.*

*26. The storage system of claim 25, wherein*

*the controller is further configured to,*

*upon completion of the first NVMe sub-command and completion of the second NVMe sub-command, transmit, to the host, a completion notification indicating that the first NVMe command issued by the host is completed.*

*27. The storage system of claim 26, wherein*

*the controller is configured to:*

*recognize the completion of the first NVMe sub-command by receiving a first completion notification from the first SSD, and*

*recognize the completion of the second NVMe sub-command by receiving a second completion notification from the second SSD.*

*28. The storage system of claim 21, wherein*

*the controller further includes:*

*an NVMe register configured to store a door bell; and*

*a memory, wherein*

*the controller is further configured to:*

*in response to the host updating the door bell, fetch the first NVMe command issued by the host and store the second NVMe command into the memory.*

*29. The storage system of claim 28, wherein*

*the controller is further configured to:*

*after storing the second NVMe command into the memory, update a door bell of the determined one of the plurality of SSDs so that the determined one of the plurality of SSDs fetches the second NVMe command from the memory.*

*30. The storage system of claim 21, wherein*

*the first NVMe command issued by the host is accompanied with a data transmission descriptor, wherein*

*the controller is further configured to:*

*on the basis of the data transmission descriptor, inform the determined one of the plurality of SSDs of a location in a memory of the host to which the determined one of the plurality of SSDs is to access in accordance with the second NVMe command.*

*31. The storage system of claim 30, wherein,*

*in a case where the first NVMe command issued by the host is a read command, the location in the memory of the host is a location into which the determined one of the plurality of SSDs is to transmit a piece of read data in accordance with the read command.*

*32. The storage system of claim 30, wherein,*

*in a case where the first NVMe command issued by the host is a write command, the location in the memory of the host is a location from which the determined one of the plurality of SSDs is to transmit a piece of write data in accordance with the write command.*

*33. The storage system of claim 30, wherein*

*the data transmission descriptor includes a plurality of entries, wherein*

*the controller is configured to:*

*on the basis of an identifier to identify each of the plurality of entries, determine an SSD among the plurality of SSDs to inform the location.*

*34. The storage system of claim 21, wherein*

*the controller further includes a central processing unit (CPU).*

*35. A controller outside of a plurality of solid state drives (SSDs), the controller comprising:*

*a first interface configured to be connected to a host, the host being configured to issue Non-Volatile Memory Express (NVMe) commands, the NVMe commands being commands based on NVMe standard;*

*a plurality of second interfaces configured to be connected to the plurality of SSDs respectively; and*

*a circuit configured to allow the host to recognize the plurality of SSDs as a single storage device by:*

*obtaining a first NVMe command issued by the host, the first NVMe command indicating a logical address range and designating access target data on a logical-block-address (LBA) basis;*

*on the basis of the logical address range, determining which one of the plurality of SSDs performs a process corresponding to the first NVMe command; and*

*issuing a second NVMe command that is based on the first NVMe command to the determined one of the plurality of SSDs, the second NVMe command designating the access target data on the LBA basis.*

*36. The controller of claim 35, wherein*

*the circuit is configured to allow the host to recognize the plurality of SSDs as a single SSD.*

*37. The controller of claim 35, wherein*

*at least one of the plurality of SSDs includes a Peripheral Component Interconnect Express (PCIe) endpoint.*

*38. The controller of claim 35, wherein*

*the circuit is configured to:*

*in a case where the first NVMe command issued by the host indicates a first logical address range, issue the second NVMe command to a first SSD among the plurality of SSDs; and*

*in a case where the first NVMe command issued by the host indicates a second logical address range, issue the second NVMe command to a second SSD among the plurality of SSDs.*

*39. The controller of claim 35, wherein*

*the circuit is further configured to:*

*generate a first NVMe sub-command and a second NVMe sub-command on the basis of the first NVMe command issued by the host;*

*issue, as the second NVMe command, the first NVMe sub-command to a first SSD among the plurality of SSDs; and*

*issue, as the second NVMe command, the second NVMe sub-command to a second SSD among the plurality of SSDs.*

*40. The controller of claim 39, wherein*

*the circuit is further configured to:*

*upon completion of the first NVMe sub-command and completion of the second NVMe sub-command, transmit, to the host a completion notification indicating that the first NVMe command issued by the host is completed.*

*41. The controller of claim 40, wherein*

*the circuit is configured to:*

*recognize the completion of the first NVMe sub-command by receiving a first completion notification from the first SSD, and*

*recognize the completion of the second NVMe sub-command by receiving a second completion notification from the second SSD.*

*42. The controller of claim 35, further comprising:*

*an NVMe register configured to store a door bell; and*

*a memory, wherein*

*the circuit is further configured to:*

*in response to the host updating the door bell fetch the first NVMe command issued by the host and store the second NVMe command into the memory.*

*43. The controller of claim 42, wherein*

*the circuit is further configured to:*

*after storing the second NVMe command into the memory, update a door bell of the determined one of the plurality of SSDs so that the determined one of the plurality of SSDs fetches the second NVMe command from the memory.*

*44. The controller of claim 35, wherein*

*the first NVMe command issued by the host is accompanied with a data transmission descriptor, wherein*

*the circuit is further configured to:*

*on the basis of the data transmission descriptor, inform the determined one of the plurality of SSDs of a location in a memory of the host to which the determined one of the plurality of SSDs is to access in accordance with the second NVMe command.*

*45. The controller of claim 44, wherein,*

*in a case where the first NVMe command issued by the host is a read command, the location in the memory of the host is a location into which the determined one of the plurality of SSDs is to transmit a piece of read data in accordance with the read command.*

*46. The controller of claim 44, wherein,*

*in a case where the first NVMe command issued by the host is a write command, the location in the memory of the host is a location from which the determined one of the plurality of SSDs is to transmit a piece of write data in accordance with the write command.*

*47. The controller of claim 44, wherein*

*the data transmission descriptor includes a plurality of entries, wherein*

*the circuit is configured to:*

*on the basis of an identifier to identify each of the plurality of entries, determine an SSD among the plurality of SSDs to inform the location.*

*48. The controller of claim 35, wherein*

*the circuit comprises a central processing (CPU).*

*49. A computer program product comprising:*

*a non-transitory computer-readable medium in which a computer program is stored, the computer program being to be executed by a computer outside of a plurality of solid state devices (SSDs),*

*the computer including:*

*a first interface configured to be connected to a host, the host being configured to issue Non-Volatile Memory Express (NVMe) commands, the NVMe commands being commands based on NVMe standard;*

*a plurality of second interfaces configured to be connected to the plurality of SSDs respectively; and*

*a central processing unit (CPU) configured to execute the computer program,*

*the computer program being configured to cause the computer to allow the host to recognize the plurality of SSDs as a single storage device by:*

*obtaining a first NVMe command issued by the host, the first NVMe command indicating a logical address range and designating access target data on a logical-block-address (LBA) basis;*

*on the basis of the logical address range, determining which one of the plurality of SSDs performs a process corresponding to the first NVMe command; and*

*issuing a second NVMe command that is based on the first NVMe command to the determined one of the plurality of SSDs, the second NVMe command designating the access target data on the LBA basis.*

*50. The computer program product of claim 49, wherein*

*the computer program is configured to cause the computer to allow the host to recognize the plurality of SSDs as a single SSD.*

*51. The computer program product of claim 49, wherein*

*at least one of the plurality of SSDs includes a Peripheral Component Interconnect Express (PCIe) endpoint.*

*52. The computer program product of claim 49, wherein*

*the computer program is configured to cause the computer to:*

*in a case where the first NVMe command issued by the host indicates a first logical address range, issue the second NVMe command to a first SSD among the plurality of SSDs; and*

*in a case where the first NVMe command issued by the host indicates a second logical address range, issue the second NVMe command to a second SSD among the plurality of SSDs.*

*53. The computer program product of claim 49, wherein*

*the computer program is further configured to cause the computer to:*

*generate a first NVMe sub-command and a second NVMe sub-command on the basis of the first NVMe command issued by the host;*

*issue, as the second NVMe command, the first NVMe sub-command to a first SSD among the plurality of SSDs; and*

*issue, as the second NVMe command, the second NVMe sub-command to a second SSD among the plurality of SSDs.*

*54. The computer program product of claim 53, wherein*

*the computer program is further configured to cause the computer to:*

*upon completion of the first NVMe sub-command and completion of the second NVMe sub-command, transmit, to the host, a completion notification indicating that the first NVMe command issued by the host is completed.*

*55. The computer program product of claim 54, wherein*

*the computer program is configured to cause the computer to:*

*recognize the completion of the first NVMe sub-command by receiving a first completion notification from the first SSD, and*

*recognize the completion of the second NVMe sub-command by receiving a second completion notification from the second SSD.*

*56. The computer program product of claim 49, wherein*

*the computer further includes:*

*an NVMe register configured to store a door bell; and*

*a memory, wherein*

*the computer program is further configured to cause the computer to:*

*in response to the host updating the door bell, fetch the first NVMe command issued by the host and store the second NVMe command into the memory.*

*57. The computer program product of claim 56, wherein*

*the computer program is further configured to cause the computer to:*

*after storing the second NVMe command into the memory, update a door bell of the determined one of the plurality of SSDs so that the determined one of the plurality of SSDs fetches the second NVMe command from the memory.*

*58. The computer program product of claim 49, wherein*

*the first NVMe command issued by the host is accompanied with a data transmission descriptor, wherein*

*the computer program is further configured to cause the computer to:*

*on the basis of the data transmission descriptor, inform the determined one of the plurality of SSDs of a location in a memory of the host to which the determined one of the plurality of SSDs is to access in accordance with the second NVMe command.*

*59. The computer program product of claim 58, wherein,*

*in a case where the first NVMe command issued by the host is a read command, the location in the memory of the host is a location into which the determined one of the plurality of SSDs is to transmit a piece of read data in accordance with the read command.*

*60. The computer program product of claim 58, wherein,*

*in a case where the first NVMe command issued by the host is a write command, the location in the memory of the host is a location from which the determined one of the plurality of SSDs is to transmit a piece of write data in accordance with the write command.*

*61. The computer program product of claim 58, wherein*

*the data transmission descriptor includes a plurality of entries, wherein*

*the computer program is further configured to cause the computer to:*

*on the basis of an identifier to identify each of the plurality of entries, determine an SSD among the plurality of SSDs to inform the location.*

*62. A method of controlling a plurality of solid state drives (SSDs), comprising:*

*making, by a controller outside of the plurality of SSDs, a host configured to issue Non-Volatile Memory Express (NVMe) commands that are commands based on NVMe standard recognize the plurality of SSDs as a single storage device by:*

*obtaining a first NVMe command issued by the host, the first NVMe command indicating a logical address range and designating access target data on a logical-block-address (LBA) basis;*

*on the basis of the logical address range determining which one of the plurality of SSDs performs a process corresponding to the first NVMe command; and*

*issuing a second NVMe command that is based on the first NVMe command to the determined one of the plurality of SSDs, the second NVMe command designating the access target data on the LBA basis.*

*63. The method of claim 62, wherein*

*the host recognizes the plurality of SSDs as a single SSD.*

*64. The method of claim 62, wherein*

*at least one of the plurality of SSDs includes a Peripheral Component Interconnect Express (PCIe) endpoint.*

*65. The method of claim 62, wherein*

*in a case where the first NVMe command issued by the host indicates a first logical address range, the second NVMe command is issued to a first SSD among the plurality of SSDs; and*

*in a case where the first NVMe command issued by the host indicates a second logical address range, the second NVMe command is issued to a second SSD among the plurality of SSDs.*

*66. The method of claim 62, further comprising:*

*generating a first NVMe sub-command and a second NVMe sub-command on the basis of the first NVMe command issued by the host;*

*issuing, as the second NVMe command, the first NVMe sub-command to a first SSD among the plurality of SSDs; and*

*issuing, as the second NVMe command, the second NVMe sub-command to a second SSD among the plurality of SSDs.*

*67. The method of claim 66, further comprising:*

*upon completion of the first NVMe sub-command and completion of the second NVMe sub-command, transmitting, to the host, a completion notification indicating that the first NVMe command issued by the host is completed.*

*68. The method of claim 67, further comprising:*

*recognizing the completion of the first NVMe sub-command by receiving a first completion notification from the first SSD, and*

*recognizing the completion of the second NVMe sub-command by receiving a second completion notification from the second SSD.*

*69. The method of claim 62, further comprising:*

*in response to the host updating a door bell stored in an NVMe register,*

*fetching the first NVMe command issued by the host, and*

*storing the second NVMe command into a memory.*

*70. The method of claim 69, further comprising:*

*after storing the second NVMe command into the memory, updating a door bell of the determined one of the plurality of SSDs so that the determined one of the plurality of SSDs fetches the second NVMe command from the memory.*

*71. The method of claim 62, wherein*

*the first NVMe command issued by the host is accompanied with a data transmission descriptor, wherein the method further comprises:*

*on the basis of the data transmission descriptor, informing the determined one of the plurality of SSDs of a location in a memory of the host to which the determined one of the plurality of SSDs is to access in accordance with the second NVMe command.*

*72. The method of claim 71, wherein,*

*in a case where the first NVMe command issued by the host is a read command, the location in the memory of the host is a location into which the determined one of the plurality of SSDs is to transmit a piece of read data in accordance with the read command.*

*73. The method of claim 71, wherein,*

*in a case where the first NVMe command issued by the host is a write command, the location in the memory of the host is a location from which the determined one of the plurality of SSDs is to transmit a piece of write data in accordance with the write command.*

*74. The method of claim 71, wherein*

*the data transmission descriptor includes a plurality of entries, wherein the method further comprises:*

*on the basis of an identifier to identify each of the plurality of entries, determining an SSD among the plurality of SSDs to inform the location.*

* * * * *